(12) United States Patent
Barrett et al.

(10) Patent No.: US 12,404,844 B2
(45) Date of Patent: Sep. 2, 2025

(54) DUCTED ELECTROAERODYNAMIC THRUSTERS

(71) Applicant: Massachusetts Institute of Technology, Cambridge, MA (US)

(72) Inventors: Steven Barrett, Somerville, MA (US); Haofeng Xu, Boston, MA (US); Arthur Brown, Cambridge, MA (US); Nicolas Gomez Vega, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/691,802

(22) PCT Filed: Sep. 2, 2022

(86) PCT No.: PCT/US2022/042437
§ 371 (c)(1),
(2) Date: Mar. 13, 2024

(87) PCT Pub. No.: WO2023/059413
PCT Pub. Date: Apr. 13, 2023

(65) Prior Publication Data
US 2024/0392762 A1    Nov. 28, 2024

Related U.S. Application Data

(60) Provisional application No. 63/252,390, filed on Oct. 5, 2021.

(51) Int. Cl.
*F03H 1/00*    (2006.01)
(52) U.S. Cl.
CPC .................. *F03H 1/0037* (2013.01)

(58) Field of Classification Search
CPC ... F03H 1/0037; F03H 1/0012; B64C 39/066; B64D 27/24; B64D 33/00
See application file for complete search history.

(56) References Cited

U.S. PATENT DOCUMENTS

| 2,765,975 A | 10/1956 | Lindenblad |
| 3,130,945 A | 4/1964 | de Seversky et al. |

(Continued)

FOREIGN PATENT DOCUMENTS

JP    2007-335857 A    12/2007

OTHER PUBLICATIONS

Vaddi "Analytical model for electrohydrodynamic thrust" (Year: 2020).*

(Continued)

*Primary Examiner* — David P. Olynick
(74) *Attorney, Agent, or Firm* — Wolf, Greenfield & Sacks, P.C.

(57) ABSTRACT

Electroaerodynamic devices and their methods of operation are disclosed. In one embodiment, ions are formed by dielectric barrier discharge using a time-varying voltage differential applied between a first electrode and a second electrode. The ions are then accelerated in a downstream direction using a second voltage differential applied between a third electrode and the first and/or second electrodes, where the third electrode is located downstream from the first and second electrodes. The ions may then collide with naturally charged molecules and/or atoms within a fluid to accelerate the fluid in the downstream to create an ionic wind and an associated thrust.

20 Claims, 19 Drawing Sheets

(56) References Cited

U.S. PATENT DOCUMENTS

| | | | |
|---|---|---|---|
| 6,145,298 A * | 11/2000 | Burton, Jr. | ............ F03H 1/0012 |
| | | | 60/202 |
| 6,919,698 B2 | 7/2005 | Krichtafovitch | |
| 7,532,451 B2 | 5/2009 | Krichtafovitch et al. | |
| 10,119,527 B2 | 11/2018 | Krauss | |
| 2007/0275494 A1 | 11/2007 | Mayer et al. | |
| 2010/0102527 A1 | 4/2010 | Yanagida | |
| 2016/0040658 A1 * | 2/2016 | Krauss | .................. F03H 1/0018 |
| | | | 60/202 |
| 2020/0386213 A1 | 12/2020 | Barrett et al. | |
| 2023/0322368 A1 | 10/2023 | Barrett et al. | |

OTHER PUBLICATIONS

International Search Report and Written Opinion mailed Jan. 5, 2023, for Application No. PCT/US2022/042437.

International Preliminary Report on Patentability mailed Apr. 18, 2024, for Application No. PCT/US2022/042437.

Gilmore, Electro-aerodynamic thrust for fixed-wing aircraft propulsion. Thesis. Doctor of Philosophy. Massachusetts Institute of Technology. 2017. 18 pages.

\* cited by examiner

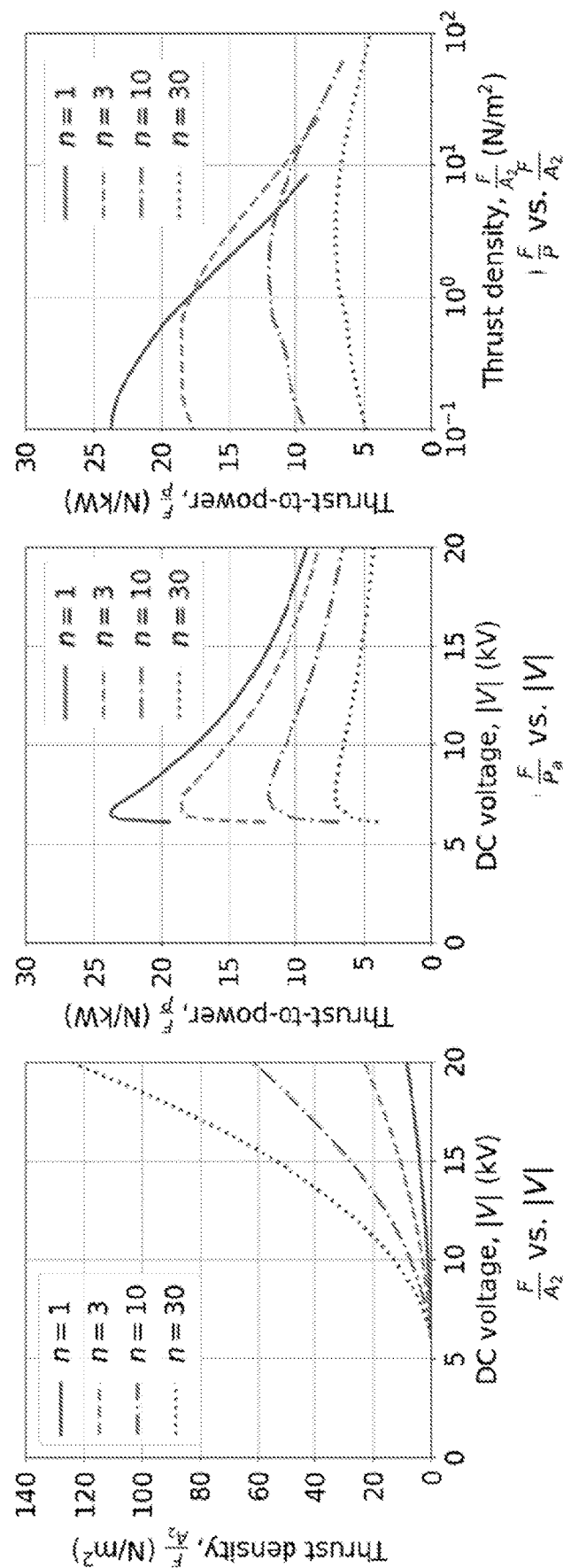

DUCTED ELECTROAERODYNAMIC THRUSTERS

CROSS-REFERENCE TO RELATED APPLICATIONS

This application is a national stage filing under 35 U.S.C. § 371 of international application serial number PCT/US2022/042437, filed Sep. 2, 2022, which claims the benefit under 35 U.S.C. § 119 (e) of U.S. provisional application Ser. No. 63/252,390, filed Oct. 5, 2021, the disclosures of which are incorporated by reference in their entirety.

FIELD

Ducted electroaerodynamic thrusters, and associated systems and methods are generally described.

BACKGROUND

Electroaerodynamic (EAD) devices produce a flow of fluid, and corresponding thrust, using solid-state components and applied electric fields while being nearly silent and producing no combustion emissions. In addition, while not as powerful as combustion or propeller-based propulsion, EAD propulsion has also been proven capable of sustaining flight of heavier-than-air airplanes. The most successful EAD propulsion devices thus far have used a direct current (DC) corona discharge to produce ions and the same DC field to accelerate those ions to produce a thrust.

SUMMARY

In one aspect, an electroaerodynamic device is provided. According to some embodiments, the electroaerodynamic device comprises: a duct including an inlet and an outlet; a plurality of serially arranged electroaerodynamic stages disposed in the duct along at least a portion of a length of the device, wherein each stage of the plurality of electroaerodynamic stages includes a plurality of ion sources and a plurality of ion collectors distributed across at least a portion of a height of the device.

In another aspect, an electroaerodynamic device is provided. According to some embodiments, the electroaerodynamic device comprises: a duct including an inlet and an outlet; an electroaerodynamic stage disposed in the duct along at least a portion of a length of the duct, wherein the electroaerodynamic stage includes a plurality of ion sources and a plurality of ion collectors, and wherein the electroaerodynamic stage includes at least one ion source of the plurality of ion sources extending across a width of the duct and at least one ion collector of the plurality of ion collectors extending across the width of the duct.

In still another aspect, an aircraft is provided. According to some embodiments, the aircraft comprises: at least one electroaerodynamic device comprising: a duct configured to function as a lifting surface, and a plurality of serially arranged electroaerodynamic stages disposed in the duct along at least a portion of a length of the duct, wherein each electroaerodynamic stage of the plurality of electroaerodynamic stages includes at least one ion source and at least one ion collector.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 18A presents simulated thruster properties of electroaerodynamic devices, according to some embodiments;

FIG. 18B presents simulated thruster properties of electroaerodynamic devices, according to some embodiments;

FIG. 18C presents simulated thruster properties of electroaerodynamic devices, according to some embodiments;

DETAILED DESCRIPTION

Figure 1:
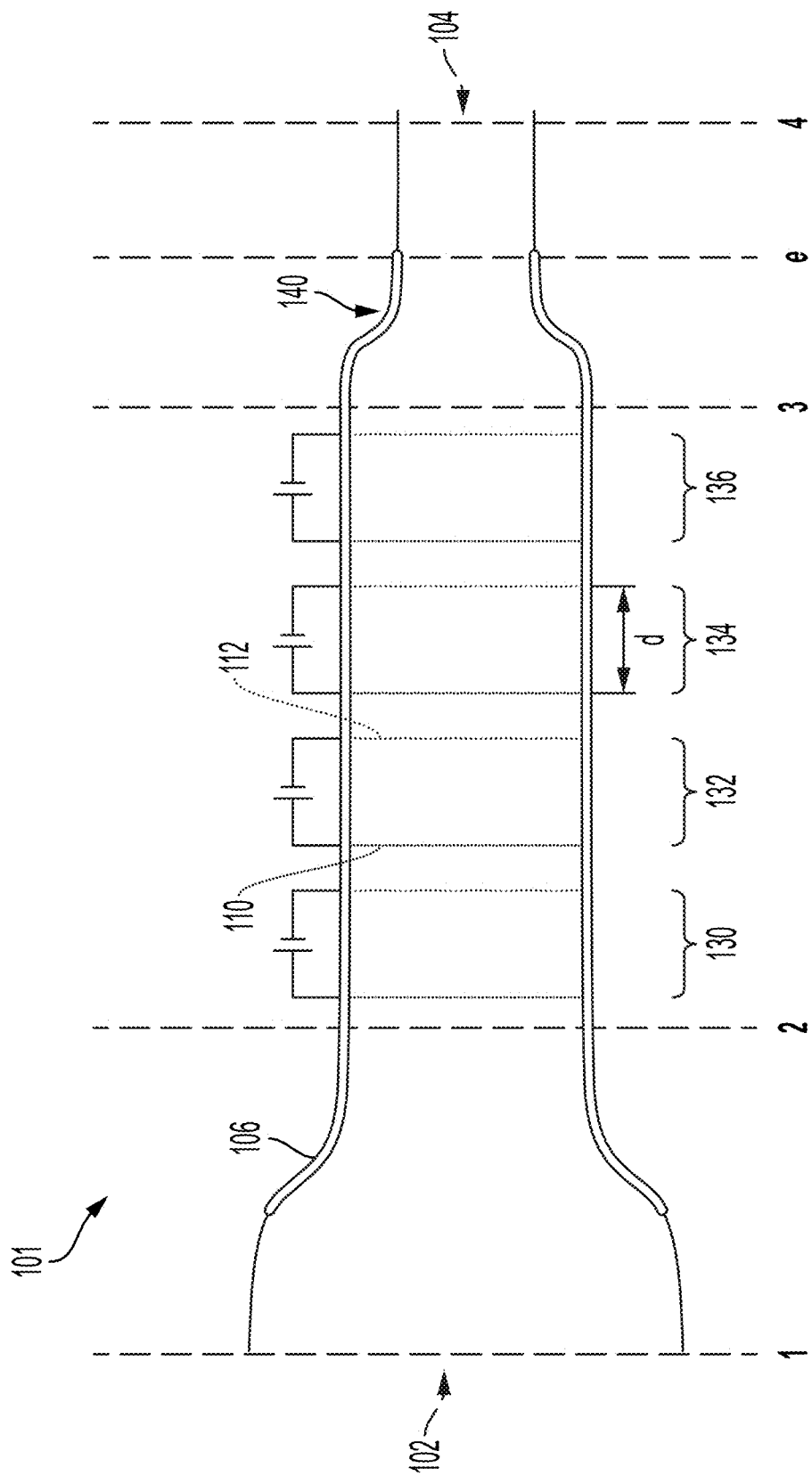
FIG. 1 presents a cross-sectional schematic illustration of an electroaerodynamic device comprising a plurality of stages, according to some embodiments.

An aircraft propulsion system generally benefits from a high thrust-to-power ratio and thrust density. High thrust-to-power, which is thrust force per unit input power, corresponds to lower energy storage and power supply requirements and therefore longer range and endurance. Thus, it may be desirable to provide an efficient thruster with a high thrust-to-power ratio. High thrust density, which is thrust force per unit span, area, or volume, reduces the size, weight, and aerodynamic drag of the propulsion system. However, the Inventors have recognized that traditional electroaerodynamic devices (EADs) are subject to a performance tradeoff where increasing thrust density reduces efficiency (i.e. thrust-to-power ratio).

In view of the above, the Inventors have recognized the benefits associated with ducted electroaerodynamic devices, and associated with multi-stage electroaerodynamic devices. Herein, it is recognized that ducted electroaerodynamic devices and multi-stage electroaerodynamic devices can simultaneously improve thrust-to-power ratio and thrust density relative to other electroaerodynamic devices, thereby providing improved functionality. In some embodiments, the electroaerodynamic devices described herein may be suitable for use in aircraft, where they may act as more powerful and efficient thrusters. In addition to their heightened efficiency and power, the electroaerodynamic devices may be quieter than conventional alternatives, and may provide advantages for use in quiet aircraft.

In one aspect, an electroaerodynamic device is provided. The electroaerodynamic device may comprise a duct. In some embodiments, the duct may improve the thrust density and/or the thrust-to-power ratio of the electroaerodynamic device, relative to an otherwise identical electroaerodynamic device without a duct. In some embodiments, the electroaerodynamic device is a thruster (e.g., for an aircraft, as described in greater detail below).

An electroaerodynamic device may comprise a stage comprising one or more ion sources and one or more ion collectors. Generally, a stage includes one or more ion sources and one or more ion collectors, wherein each ion source of the stage is configured to transmit a flow of ions to an ion collector of the stage. If the stage comprises a plurality of ion sources, a stage generally is configured such that each flow of ions within the stage at least partially overlaps with another flow of ions within the stage along a downstream length of the stage. For example, the ion sources and/or ion collectors may be laterally aligned, such that the flows of ions start and/or end at a same position along a length of the stage, in some embodiments. A stage may be configured to increase a pressure of a fluid within the electroaerodynamic device in a downstream direction of the electroaerodynamic device. In some embodiments, the ion collector is downstream of the ion source, such that a flow of ions from the ion source to the ion collector accelerates a downstream flow of a fluid in an electroaerodynamic device.

It may be advantageous for a stage to comprise a plurality of pairs of ion sources and ion collectors. In some embodiments, at least some pairs of ion sources and ion collectors are configured to generate parallel flows of ions. Such a configuration of ion sources and ion collectors may be advantageous, particularly when the parallel flows of ions are aligned with a downstream direction of the electroaerodynamic device, because without wishing to be bound by any particular theory, parallelized ion flow may reduce turbulence within the device. Of course, other configurations are also possible, as the disclosure is not so limited. It should be understood that flows of ions may overlap along a downstream length of the stage, even if they are mutually parallel currents. For example, a mutually parallel first and second flow of ions may overlap, such that a lateral cross-section of the stage perpendicular to the downstream length of the stage intersects both flows of ions.

The use of multiple stages may, in some cases, improve the thrust produced by an electroaerodynamic device. In some embodiments, an electroaerodynamic device comprises a plurality of stages positioned serially along a length of the electroaerodynamic device. Examples of electroaerodynamic devices comprising multiple stages are provided with reference to the figures below. In some embodiments, serial positioning of stages within the electroaerodynamic device permits serial boosting of fluid pressure along a length of an electroaerodynamic device. For example, in some embodiments, a second stage is positioned downstream from a first stage, where the first stage increases downstream fluid pressure to a first pressure between the first stage and the second stage and the second stage increases the fluid pressure further to a second pressure greater than the first pressure. It should be understood that the noted pressures may refer to a total pressure of the fluid which may be defined as a combination of the static and dynamic pressures of the fluid at a given location.

Although in some embodiments, a stage may comprise exactly one ion source and exactly one ion collector, it has been recognized herein that a stage comprising a plurality of ion sources and/or a plurality of ion collectors may provide any of a variety of advantages for use in an electroaerodynamic device. For example, use of a plurality of ion collectors and/or a plurality of ion sources within a stage may be associated with increased fluid flow for a given voltage and/or pressure differential across a single stage of an electroaerodynamic device. Thus, in some embodiments, a stage comprises both a plurality of ion sources and a plurality of ion collectors. For example, the stage may comprise a plurality of ion sources and/or a plurality of ion collectors that are spaced apart from one another in at least one direction that is perpendicular to a longitudinal, downstream axis of a duct. The ion sources and/or ion sinks may be regularly or irregularly spaced. In some embodiments, it may be advantageous for the total number of ion sources to equal the total number of ion collectors, such that each ion source may be paired with an associated ion collector. However, in some embodiments, a number of ion sources may differ from a number of ion collectors as the disclosure is not so limited.

Enclosing some or all stages of the electroaerodynamic device may present certain performance advantages, as discussed below. In some embodiments, a stage is situated within a duct of an electroaerodynamic device. Generally, a duct comprises an enclosure including an inner surface extending between an inlet of the duct and an outlet of the duct. The enclosure may form an enclosed volume between the inlet and the outlet. The inlet may be upstream of the outlet, such that fluid entering the inlet may flow in a downstream direction through the duct to the outlet. In some embodiments, a duct comprises more than one inlet and/or more than one outlet. Additionally in some embodiments, the duct may comprise one or more additional smaller openings along the length of the duct as it is not generally necessary for the duct to totally enclose the fluid between the inlet and the outlet. In some embodiments, the duct is configured to inhibit lateral escape of fluid from an electroaerodynamic device. For example, the duct may be impenetrable to fluid, except at its inlet and its outlet. In the context of the present disclosure, it has been recognized that use of a duct in combination with an electroaerodynamic device may improve thrust density and/or thrust-to-power of an electroaerodynamic device. Use of the duct may provide other advantages, such as noise reduction of an electroaerodynamic device.

In some embodiments, a duct comprises a constant lateral cross-section along at least a portion of its length. For example, a duct may have a constant cross-sectional size and shape along at least a portion of its length. In some embodiments, one or more stages disposed within the duct may be disposed along a portion of the length of the duct comprising a constant cross-section. For example, in some embodiments, an electroaerodynamic device comprises a plurality of stages, and two or more of the stages of the plurality of stages are disposed along a portion of the duct having a constant lateral cross-section, as discussed in greater detail with reference to the figures below. However, the use of stages in portions of a duct having different cross-sectional sizes and/or shapes are also contemplated as well as the use of ducts having portions either upstream and/or downstream from the electroaerodynamic stages with either larger, smaller, or differently shaped cross sections are contemplated. For example, larger inlets and smaller nozzled outlets may be included in a duct in some embodiments.

In some applications, it may be desirable for the disclosed electroaerodynamic devices to be configured to function as a lifting surface in an aircraft. For example, a duct may comprise one or more portions that include an airfoil where the one or more airfoils at least partially enclose fluid between the inlet and the outlet of the duct. Use of an airfoil as a portion of a duct may be advantageous for an electroaerodynamic thruster, since the airfoil may permit the duct to replace the mass and function of other portions of an aircraft where the electroaerodynamic thruster may double as both a thruster and a lifting surface within an aircraft.

A ducted electroaerodynamic device may provide a number of advantages over a non-ducted analog. For example, a duct may increase thrust density and thrust-to-power ratio of the electroaerodynamic device. Without wishing to be bound by any particular theory, the duct may also help to restrict fluid flow within the device to a downstream direction, thereby limiting undesirable turbulence and loss of fluid momentum.

Another advantage of ducting an electroaerodynamic device is that a ducted electroaerodynamic device may be quieter than a non-ducted electroaerodynamic device. Thus, a duct may be useful for producing quieter aircraft. In some embodiments, a duct enclosure comprises an acoustic liner configured to dampen sound from the electroaerodynamic stage. As discussed with reference to the examples below, ducted electroaerodynamic devices may significantly reduce noise emission, relative to more conventional aircraft thrusters.

An electroaerodynamic device may comprise any of a variety of suitable numbers of ion sources. In some embodiments, a plurality of ion sources included in a single stage of an electroaerodynamic device may include greater than or equal to 2, greater than or equal to 3, greater than or equal to 4, greater than or equal to 5, greater than or equal to 8, greater than or equal to 10, greater than or equal to 20, greater than or equal to 30, greater than or equal to 40, greater than or equal to 50, greater than or equal to 80, greater than or equal to 100, greater than or equal to 200, greater than or equal to 500, greater than or equal to 1,000, greater than or equal to 2,000, greater than or equal to 5,000, or more ion sources. In some embodiments, a plurality of ion sources includes less than or equal to 10,000, less than or equal to 5,000, less than or equal to 2,000, less than or equal to 1,000, less than or equal to 500, less than or equal to 200, less than or equal to 100, less than or equal to 80, less than or equal to 50, less than or equal to 40, less than or equal to 30, less than or equal to 20, less than or equal to 10, less than or equal to 5, or fewer ion sources. Combinations of these ranges are possible. For example, in some embodiments, a plurality of ion sources includes greater than or equal to 2 and less than or equal to 10,000 ion sources. Numbers of ion sources both greater and less than those noted above may be used as the disclosure is not so limited.

An electroaerodynamic device may comprise any of a variety of suitable numbers of ion collectors. In some embodiments, a plurality of ion collectors includes greater than or equal to 2, greater than or equal to 3, greater than or equal to 4, greater than or equal to 5, greater than or equal to 8, greater than or equal to 10, greater than or equal to 20, greater than or equal to 30, greater than or equal to 40, greater than or equal to 50, greater than or equal to 80, greater than or equal to 100, greater than or equal to 200, greater than or equal to 500, greater than or equal to 1,000, greater than or equal to 2,000, greater than or equal to 5,000, or more ion collectors. In some embodiments, a plurality of ion collectors includes less than or equal to 10,000, less than or equal to 5,000, less than or equal to 2,000, less than or equal to 1,000, less than or equal to 500, less than or equal to 200, less than or equal to 100, less than or equal to 80, less than or equal to 50, less than or equal to 40, less than or equal to 30, less than or equal to 20, less than or equal to 10, less than or equal to 5, or fewer ion collectors. Combinations of these ranges are possible. For example, in some embodiments, a plurality of ion collectors includes greater than or equal to 2 and less than or equal to 10,000 ion collectors. Numbers of ion collectors both greater and less than those noted above may be used as the disclosure is not so limited.

As noted above, in some embodiments, the plurality of ion sources and/or ion collectors within a stage may be spaced apart from one another in one or more directions perpendicular to a longitudinal axis of the duct and/or an overall downstream direction flowing past the ion sources and/or collectors. For example, in some embodiments, a plurality of ion sources and/or a plurality of ion collectors may be distributed along at least a portion of, and in some embodiments an entire, height of a duct of an electroaerodynamic device, such as a thruster. For example, the plurality of ion sources and/or the plurality of ion collectors may be regularly spaced along a height of the electroaerodynamic device. In some embodiments, the plurality of ion sources and/or the plurality of ion collectors are configured such that each ion collector of the plurality extends across at least a portion, and in some embodiments, an entire, width of the duct of an electroaerodynamic device. Of course, electroaerodynamic devices may have any of a variety of suitable geometries and/or arrangements, including non-uniform spacings, as discussed in greater detail below, as the disclosure is not so limited.

The disclosed electroaerodynamic devices may be used for any of a number of different applications. For example, an electroaerodynamic device, as described herein, may be used to generate propulsive forces in any appropriate fluid without any moving parts. Examples of such applications may include use as a thruster in an aircraft (e.g. a quadcopter, an airplane, etc.). The improvements in thrust density and thrust-to-power ratio resulting from the use of multiple stages and/or ducting of the electroaerodynamic device may make the electroaerodynamic device particularly suitable for aircraft applications. In some embodiments, an aircraft comprises more than one electroaerodynamic device. For example, an aircraft may include 2, 3, 4, 5, 6, 7, 8, 9, 10, or more electroaerodynamic devices as described herein. In some embodiments, an aircraft comprises exactly 1 electroaerodynamic device.

While applications in aircraft may be desirable, the disclosed electroaerodynamic devices may also be used as solid-state actuators for applications in pumping, heat transfer, flow control, and/or any other application where it is desirable to accelerate a fluid in a particular direction. Appropriate types of fluids that any of the disclosed electroaerodynamic devices may be operated in may include, but are not limited to, atmospheric air, gases, liquids (e.g. silicon oil, kerosene, insulating liquids, and other appropriate liquids), and/or any other appropriate where at least a portion of the fluid is capable of being ionized and accelerated to create a flow of the fluid through any of electroaerodynamic devices disclosed herein.

Ions may provide thrust by any of a variety of suitable methods. For example, an electroaerodynamic device may form ions using dielectric barrier discharge, corona discharge, and/or nanosecond repetitively-pulsed discharge. Other forms of ion generation may also be used as the disclosure is not so limited. The ions may be accelerated in a downstream direction. Accelerated ions may collide with neutral molecules and/or atoms as they travel in the downstream direction, imparting at least a portion of their momentum to the molecules and/or atoms to accelerate the overall fluid within the device in the downstream direction as well. This may result in the generation of an ionic wind where the fluid present in the electroaerodynamic device flows in the downstream direction through the electroaerodynamic device.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 presents a schematic, cross-sectional illustration of non-limiting electroaerodynamic device 101, according to some embodiments. Electroaerodynamic device 101 comprises inlet 102, outlet 104, and duct 106 extending between the inlet and outlet. Each of inlet 102 and outlet 104 may each independently have any of a variety of appropriate cross-sectional geometries. For example, inlet 102 and outlet 104 may each independently have a cross-sectional shape selected from the group of: a circle; an ellipse; a polygon (e.g., a triangle, a square, a rectangle, a hexagon, or any other appropriate polygon). As shown in FIG. 1, inlet 102 and outlet 104 have different cross-sectional geometries. For example, the inlet may have a larger cross-sectional area and the outlet may have a smaller cross sectional area as compared to one another and one or more intermediate portions of the duct. Thus, the outlet, may comprise a nozzle geometry in some embodiments. However, it should be understood that inlet 102 and outlet 104 may have the same cross-sectional geometries and/or may exhibit any other desired geometry as the disclosure is not so limited.

In some embodiments, the inlet and outlet may be coupled to an external atmosphere surrounding the electroaerodynamic device. However, embodiments in which the fluid source in fluid communication with the inlet is an internal fluid source such as a fluid reservoir are also envisioned. Additionally, the outlet does not necessarily need to be in fluid communication with an external atmosphere. For instance, the outlet may be connected to an internal channel along which the accelerated fluid may flow. Thus, it should be understood that the inlet and/or outlet of a device may be connected to any desired structure and/or environment and may have any appropriate construction as the disclosure is not limited to any particular application or device where it is desirable to produce a flow of fluid.

An inlet or an outlet of an electroaerodynamic device, such as inlet 102 or outlet 104, may have any of a variety of appropriate cross-sectional areas. In some embodiments, an inlet or outlet of an electroaerodynamic device has a cross-sectional area of greater than or equal to 0.005 m$^2$, greater than or equal to 0.01 m$^2$, greater than or equal to 0.1 m$^2$, greater than or equal to 1 m², greater than or equal to 2 m², greater than or equal to 3 m², greater than or equal to 4 m², greater than or equal to 5 m², greater than or equal to 10 m², or greater. In some embodiments, an inlet or outlet of an electroaerodynamic device has a cross-sectional area of less than or equal to 20 m², less than or equal to 15 m², less than or equal to 10 m², less than or equal to 5 m², less than or equal to 4 m², less than or equal to 3 m², or less. Combinations of these ranges are possible. For example, in some embodiments, an inlet or outlet of an electroaerodynamic device has a cross-sectional area of greater than or equal to 0.005 m² and less than or equal to 20 m². Inlets and outlets having cross-sectional areas both greater and less than those noted above may be used as the disclosure is not so limited.

The device may have any of a variety of average lengths between an inlet and an outlet. In some embodiments, an average length between an inlet and an outlet of an electroaerodynamic device is greater than or equal to 0.005 m, greater than or equal to 0.01 m, greater than or equal to 0.02 m, greater than or equal to 0.03 m, greater than or equal to 0.05 m, greater than or equal to 0.1 m, greater than or equal to 0.2 m, greater than or equal to 0.3 m, greater than or equal to 0.5 m, greater than or equal to 1 m, greater than or equal to 2 m, greater than or equal to 3 m, or greater. In some embodiments, an average length between an inlet and an outlet of an electroaerodynamic is less than or equal to less than or equal to 5 m, less than or equal to 3 m, less than or equal to 2 m, less than or equal to 1 m, less than or equal to 0.5 m, less than or equal to 0.3 m, less than or equal to 0.2 m, less than or equal to 0.1 m, or less. Combinations of these ranges are possible. For example, in some embodiments, an average length between an inlet and an outlet of an electroaerodynamic device perpendicular to a downstream direction is greater than or equal to 0.005 m and less than or equal to 5 m. Lengths both greater and less than those noted above may be used as the disclosure is not so limited.

As shown, electroaerodynamic device 101 comprises serially arranged stages 130, 132, 134, and 136 disposed within duct 106, and each stage comprises an ion source 110 and an ion collector 112, separated by a distance d. In some embodiments, two or more stages of the plurality of stages are disposed along a portion of the duct having a constant lateral cross-section. For example, referring to FIG. 1, electroaerodynamic device 101 comprises cross-sections (also referred to as "stations") 1, 2, 3, e, and 4, and the portion of duct 106 between station 2 and station 3 where the sequentially arranged stages are located has a relatively constant lateral cross-section.

In some embodiments, two or more stages of an electroaerodynamic device are disposed along a portion of the duct with a relatively constant lateral cross-section wherein the lateral cross-sectional area of the duct varies by less than or equal to 50%, less than or equal to 25%, less than or equal to 15%, less than or equal to 10%, less than or equal to 5%, less than or equal to 1%, or less. The portion of the duct may have any of a variety of suitable lengths. For example, in some embodiments, a portion of the duct having a relatively constant lateral cross-section has a length of greater than or equal to 0.05 m, greater than or equal to 0.1 m, greater than or equal to 0.2 m, greater than or equal to 0.3 m, greater than or equal to 0.5 m, greater than or equal to 1 m, or greater. In some embodiments, a portion of the duct having a relatively constant lateral cross-section has a length of less than or equal to 10 m, less than or equal to 5 m, less than or equal to 3 m, less than or equal to 1 m, less than or equal to 0.5 m, less than or equal to 0.3 m, less than or equal to 0.2 m, less than or equal to 0.1 m, or less. Combinations of these ranges are possible. For example, in some embodiments, a portion of the duct has a lateral cross-sectional area that varies by less than or equal to 50% over a length of greater than or equal to 0.05 m and less than or equal to 1 m. Lengths both greater and less than those noted above may be used as the disclosure is not so limited.

Although electroaerodynamic device 101 comprises four stages, stages 130, 132, 134, and 136, generally, an electroaerodynamic device may comprise any suitable number of stages. In some embodiments, a device includes greater than or equal to 1, greater than or equal to 2, greater than or equal to 3, greater than or equal to 4, greater than or equal to 5, greater than or equal to 8, greater than or equal to 10, greater than or equal to 20, greater than or equal to 30, greater than or equal to 40, greater than or equal to 50, greater than or equal to 80, greater than or equal to 100, greater than or equal to 200, or greater than or equal to 500 stages. In some embodiments, a device includes less than or equal to 1,000, less than or equal to 500, less than or equal to 200, less than or equal to 100, less than or equal to 50, less than or equal to 20, less than or equal to 10, less than or equal to 8, less than or equal to 5, less than or equal to 4, less than or equal to 3, or less than or equal to 2 stages. Combinations of these ranges are possible. For example, in some embodiments, a plurality of ion collectors includes greater than or equal to 1 stage and less than or equal to 1,000 stages. Numbers of stages greater than those noted above may be used as the disclosure is not so limited.

In some embodiment, a duct of an electroaerodynamic device comprises a nozzle, such as nozzle 140. The nozzle may be a reinforced portion of the duct, configured to reduce the cross-sectional area of the fluid pathway. Inclusion of a nozzle may be advantageous for increasing a pressure of fluid before its expulsion through an electroaerodynamic device. Any of a variety of appropriate nozzles may be used, as the disclosure is not so limited. Furthermore, a nozzle is not required, and in some embodiments the electroaerodynamic device does not comprise a nozzle. As an example, the outlet may be a divergent outlet (e.g., having a wider cross-sectional area than the rest of the duct).

The ion sources and/or the ion collectors may have any of a variety of appropriate geometries. For example, in some embodiments, an ion source is a pin or a wire. In some embodiments an ion collector is a mesh, a cylinder, or an airfoil. An ion source/ion collector pair may have a pin-to-mesh geometry, a wire-to-cylinder geometry, or a wire-to-airfoil geometry. Of course, while several specific combinations are provided above, other geometries for ion sources and ion collectors are also possible, as the disclosure is not so limited.

Figure 2:
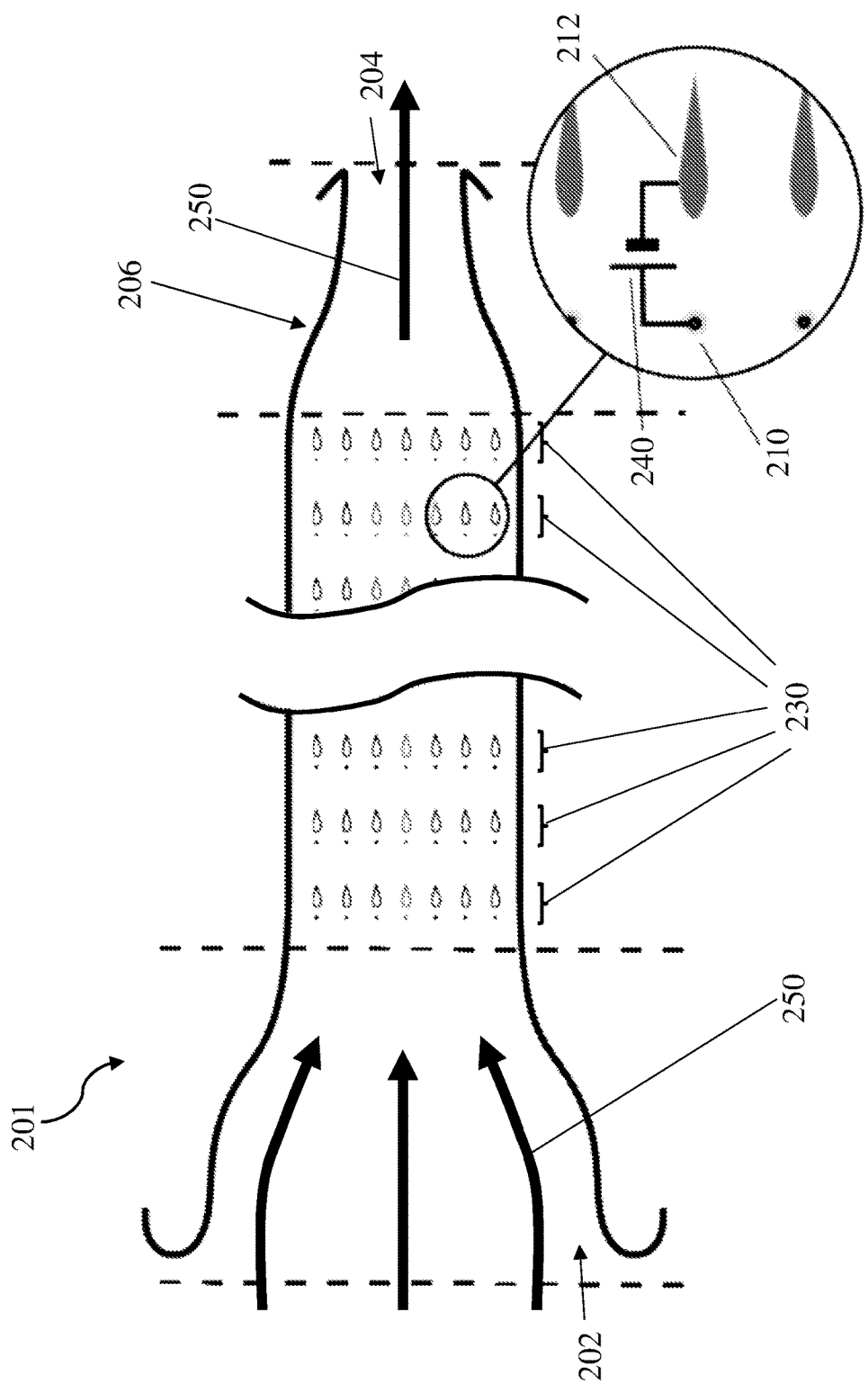
FIG. 2 presents a cross-sectional schematic illustration of an electroaerodynamic device comprising a plurality of stages comprising pairs of ion sources and ion collectors, according to some embodiments.

FIG. 2 presents a cross-sectional, schematic illustration of a nonlimiting embodiment of electroaerodynamic device 201 comprising an inlet 202, an outlet 204, a duct 206, and stages 230. Black arrows 250 illustrate a direction of fluid flow through electroaerodynamic device 201.

In some embodiments, an electroaerodynamic device comprises at least one ion source extending across at least a portion, and in some embodiments an entire, width of the duct. For example, as shown in FIG. 2, each stage 230 of electroaerodynamic device 201 comprises a plurality of ion sources 210, which are represented as wires extending across a width of duct 206 into the plane of the illustrated figure. An ion source may comprise one or more electrodes that are configured for corona discharge or dielectric barrier discharge to form ions during operation. An electrode of an ion source may have any appropriate geometry.

An ion source (e.g., a wire) may have a maximum transverse dimension (e.g. a diameter) that is greater than or equal to 5 microns, greater than or equal to 10 microns, greater than or equal to 20 microns, greater than or equal to 50 microns, greater than or equal to 100 microns, greater than or equal to 500 microns, greater than or equal to 1,000 microns, or greater. In some embodiments, an ion source has a maximum transverse dimension of less than or equal to 2,000 microns, less than or equal to 1,500 microns, less than or equal to 1,000 microns, less than or equal to 500 microns, less than or equal to 200 microns, less than or equal to 100 microns, or less. Combinations of these ranges are possible. For example, in some embodiments, an ion source has a maximum transverse dimension of greater than or equal to 5 microns and less than or equal to 2,000 microns. Maximum transverse dimensions both greater and less than those noted above may be used as the disclosure is not so limited.

Depending on the embodiment, ion sources belonging to consecutive stages may have the same polarity or different (e.g., alternating) polarities. However, in some embodiments, alternating the polarities of ion sources within consecutive stages may improve thrust density and/or thrust-to-power ratio. Without wishing to be bound by any particular theory, the improvements in thrust density and/or thrust-to-power ratio may result from reduced backflow of ions from a downstream ion source to an upstream ion collector from an adjacent stage. Backflow may be reduced, in some such embodiments, because the downstream ion source has a same polarity as an adjacent upstream ion collector.

As discussed in greater detail below, in some embodiments an ion source comprises two electrodes, of different potential. It has been recognized that such configurations may permit ion separation and ion acceleration to be driven by different potential differences, which can provide certain advantages for thrust generation.

An electrode of an ion source may also have any appropriate size and/or shape for a desired application. For example, electrode shapes may include, but are not limited to, spheres, plates, wires, cylinders, tubes, prisms, and/or any of a variety of other appropriate shapes. In some instances, the one or more electrodes, and/or all of the electrodes, of an ion source exhibit an elongated shape in the form of wires, cylinders, tubes, prisms, and/or other appropriate elongated shapes where a longitudinal length of the shape may be significantly longer than a maximum transverse dimension of the electrode taken perpendicular to the longitudinal axis of the shape. These types of elongated shapes may exhibit several advantages. Specifically, these types of structures may exhibit: simplified manufacture (e.g. coating of a wire or cylinder); reduced weights; and lower drag to surface area ratios to name a few advantages compared to other types of shapes. Electrodes exhibiting these elongated shapes may also be arranged such that they extend in parallel directions to one another which may help provide uniform ion generation and thrust within the resulting electroaerodynamic device. For example, in some embodiments, the first and second electrodes used to perform dielectric barrier discharge within an electroaerodynamic device may be oriented parallel to one another and the third collector electrode may be spaced from and oriented parallel to the first and second electrodes.

While various dimensions and shapes of the various electrodes are noted above, it should be understood that any appropriate size, shape, spacing, and/or other dimension or characteristic for the different electrodes may be used. This may include ranges of the various dimensions described above that are both greater than and less than those noted above as the disclosure is not limited to any particular electrode construction or arrangement. Electrodes may be made from any of a variety of appropriate materials. For example, in some embodiments, an electrode is at least partially (e.g., is completely) coated with a dielectric material. The dielectric material may help to prevent arcing within the electroaerodynamic device.

It should be understood that any appropriate combination of dielectric material, coating thickness, and electrode spacing may be used for a desired application. For example, dielectric materials with larger dielectric constants may be coated with smaller thicknesses and dielectric materials with smaller dielectric constants may be coated with larger thicknesses to avoid dielectric breakdown and arcing between the dielectric barrier discharge electrodes during ion formation. In some embodiments, an electrode is not coated. Appropriate dielectric materials, may include but are not limited to, various fluoropolymer compounds (Teflon fluorinated ethylene propylene (FEP), Teflon Perfluoroalkoxy alkanes (PFA), Tefzel ethylenetetrafluoroethylene (EFTE), and others), glasses, fiberglass composites (e.g. Garolite), polyimides (e.g. Kapton tape and/or polyimide coatings), and/or any other appropriate dielectric material.

Appropriate conductors that may be used to form the various electrodes of an electroaerodynamic device may correspond to any appropriately conductive material capable of conducting the desired voltages and currents. This may include conductive materials such as stainless steel, copper, aluminum, tin, tungsten, metal alloys, carbon, and/or any other appropriate conductive material.

In some embodiments, an electroaerodynamic device comprises at least one ion source extending across a width of the duct. The ion collector is generally configured to generate an electric field to accelerate the ions formed within a device. An ion collector may also have any appropriate size or shape for a desired application. For example, the ion collector may be an airfoil, like ion collector 212 shown in FIG. 2.

An ion collector (e.g., an airfoil) may have any of a variety of suitable geometries. In some embodiments, an ion collector has a maximum transverse dimension (e.g., a height or diameter) of greater than or equal to 1 mm, greater than or equal to 2 mm, greater than or equal to 3 mm, greater than or equal to 5 mm, greater than or equal to 8 mm, greater than or equal to 10 mm, or greater. In some embodiments, an ion collector has a maximum transverse dimension of less than or equal to 50 mm, less than or equal to 30 mm, less than or equal to 20 mm, less than or equal to 10 mm, less than or equal to 8 mm, less than or equal to 5 mm, or less. Combinations of these ranges are possible. For example, in some embodiments, an ion collector has a maximum transverse dimension of greater than or equal to 1 mm and less than or equal to 50 mm. As another example, in some embodiments, an ion collector has a maximum transverse dimension of greater than or equal to 1 mm and less than or equal to 20 mm. Maximum transverse dimensions both greater and less than those noted above may be used as the disclosure is not so limited.

In embodiments where the ion collector is an airfoil, the airfoil may have any of a variety of appropriate longitudinal lengths (e.g., lengths extending in a downstream direction of an electroaerodynamic device). For example, an ion collector may have a length that is greater than or equal to 100 mm 200 mm, 300 mm, and/or any other appropriate length. Correspondingly, the longitudinal length of the ion collector of a device may be less than or equal to 1000 mm, 750 mm, 500 mm, and/or any other appropriate length. Combinations of the foregoing are also possible. For example, the ion collector may have a longitudinal length of greater than or equal to 100 mm and less than or equal to 1000 mm. Longitudinal lengths both greater and less than those noted above may be used as the disclosure is not so limited.

Generally, an ion collector may be electrically connected to an ion source. For example, ion source 210 and ion collector 212 are electrically connected via voltage source 240. Like an ion source, an ion collector may be an electrode, and may comprise any of a variety of suitable materials. For example, the ion collector may comprise a conducting material as described above, and may or may not comprise a dielectric coating, as described above.

Figure 3:
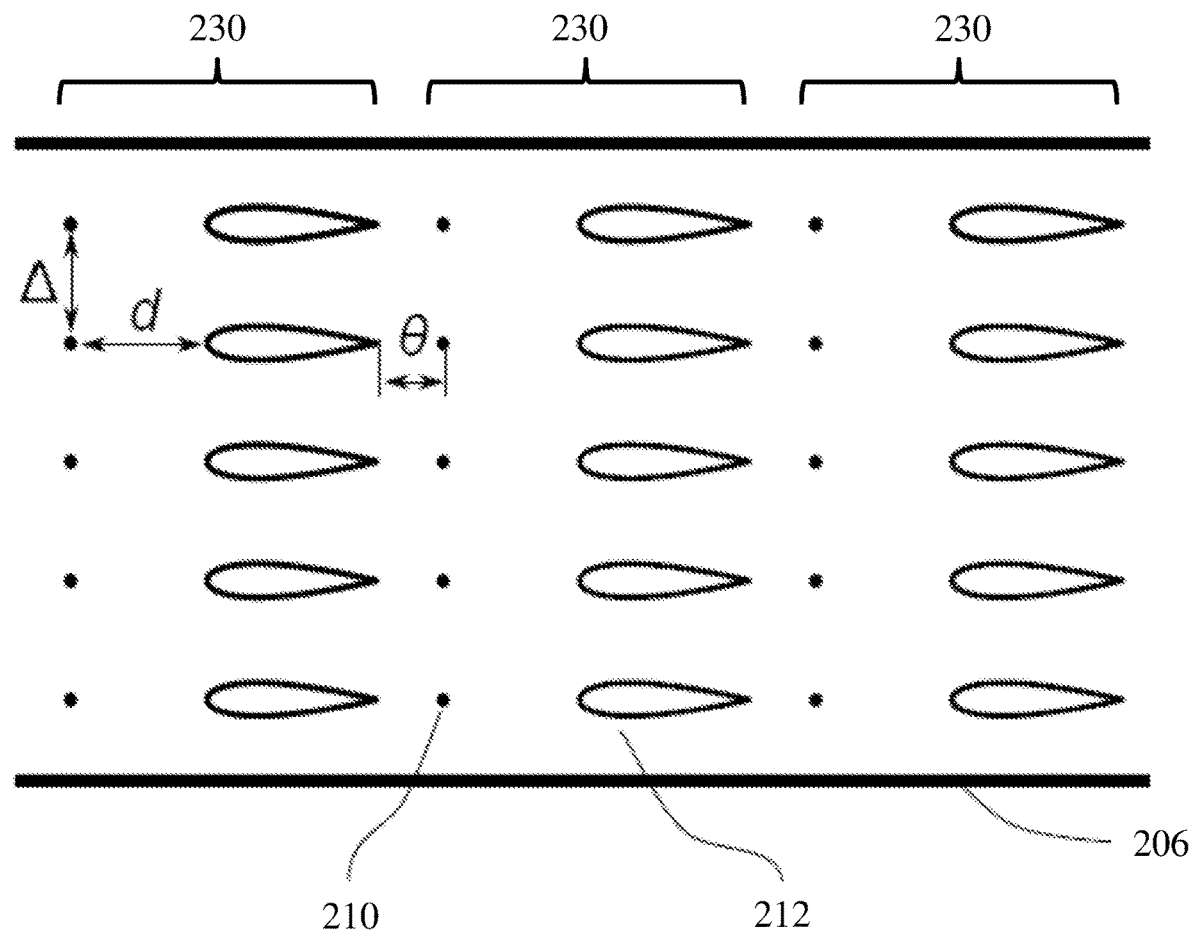
FIG. 3 presents a cross-sectional schematic illustration of a portion of a ducted electroaerodynamic device comprising a plurality of stages, according to some embodiments.

FIG. 3 provides a schematic, perspective illustration of three stages of an electroaerodynamic device, similar to electroaerodynamic device 201 of FIG. 2, and comprising stages 230 of ion sources 210 and ion collectors 212 within duct 206. As shown, ion sources and ion collectors within a single stage may be spatially separated with a spacing Δ which may either be uniform or non-uniform. In some embodiments, these ion sources and collectors may be distributed across a height of a duct the stage is disposed in. Ion sources and/or ion collectors within a stage may be separated from their adjacent counterparts by any of a variety of appropriate distances. In some embodiments, an ion source and an ion collector of a stage are separated by a distance of greater than or equal to 1 mm, greater than or equal to 2 mm, greater than or equal to 3 mm, greater than or equal to 5 mm, greater than or equal to 10 mm, greater than or equal to 15 mm, greater than or equal to 20 mm, greater than or equal to 50 mm, greater than or equal to 80 mm, greater than or equal to 100 mm, greater than or equal to 120 mm, greater than or equal to 150 mm, greater than or equal to 180 mm, or greater. In some embodiments, an ion source and an ion collector of a stage are separated by a distance of less than or equal to 200 mm, less than or equal to 180 mm, less than or equal to 150 mm, less than or equal to 120 mm, less than or equal to 100 mm, less than or equal to 80 mm, less than or equal to 50 mm, less than or equal to 20 mm, less than or equal to 15 mm, less than or equal to 10 mm, less than or equal to 5 mm, less than or equal to 3 mm, less than or equal to 2 mm, or less. Combinations of these ranges are possible. For example, in some embodiments, an ion source and an ion collector of a stage are separated by a distance of greater than or equal to 1 mm and less than or equal to 200 mm. Distances both greater and less than those noted above may be used as the disclosure is not so limited.

As noted above, ion sources and/or ion collectors may be regularly spaced within a stage, such that the spacing between adjacent ion sources and/or ion collectors is approximately equal within a stage. Alternatively, spacing between ion sources and/or ion collectors may vary within the stage.

An ion source may be separated from a downstream ion collector in the same stage by any of a variety of appropriate distances which may either be uniform or non-uniform (e.g., distance d shown in FIG. 3). In some embodiments, an ion source is separated from a downstream ion collector by a distance of greater than or equal to 1 mm, greater than or equal to 2 mm, greater than or equal to 3 mm, greater than or equal to 5 mm, greater than or equal to 10 mm, greater than or equal to 15 mm, greater than or equal to 20 mm, greater than or equal to 50 mm, greater than or equal to 80 mm, greater than or equal to 100 mm, greater than or equal to 120 mm, greater than or equal to 150 mm, greater than or equal to 180 mm, or greater. In some embodiments an ion source is separated from a downstream ion collector by a distance of less than or equal to 200 mm, less than or equal to 180 mm, less than or equal to 150 mm, less than or equal to 120 mm, less than or equal to 100 mm, less than or equal to 80 mm, less than or equal to 50 mm, less than or equal to 20 mm, less than or equal to 15 mm, less than or equal to 10 mm, less than or equal to 5 mm, less than or equal to 3 mm, less than or equal to 2 mm, or less. Combinations of these ranges are possible. For example, in some embodiments, an ion source is separated from a downstream ion collector by a distance of greater than or equal to 1 mm and less than or equal to 200 mm. Distances both greater and less than those noted above may be used as the disclosure is not so limited.

An ion collector may be separated from a downstream ion source by any of a variety of appropriate distances θ which may be uniform or non-uniform, as shown in FIG. 3. Spacing between an upstream ion collector and a downstream ion source may correspond to a space between stages, which may be important for the prevention of arcing within an electroaerodynamic device. In some embodiments, adjacent stages are separated by a distance of greater than or equal to 1 mm, greater than or equal to 2 mm, greater than or equal to 3 mm, greater than or equal to 5 mm, greater than or equal to 10 mm, greater than or equal to 15 mm, greater than or equal to 20 mm, greater than or equal to 50 mm, greater than or equal to 80 mm, greater than or equal to 100 mm, greater than or equal to 120 mm, greater than or equal to 150 mm, greater than or equal to 180 mm, or greater. In some embodiments, adjacent stages are separated by a distance of less than or equal to 200 mm, less than or equal to 180 mm, less than or equal to 150 mm, less than or equal to 120 mm, less than or equal to 100 mm, less than or equal to 80 mm, less than or equal to 50 mm, less than or equal to 20 mm, less than or equal to 15 mm, less than or equal to 10 mm, less than or equal to 5 mm, less than or equal to 3 mm, less than or equal to 2 mm, or less. Combinations of these ranges are possible. For example, in some embodiments, adjacent stages are separated by a distance of greater than or equal to 1 mm and less than or equal to 200 mm. Separation distances both greater and less than those noted above may be used as the disclosure is not so limited.

Figure 4A:
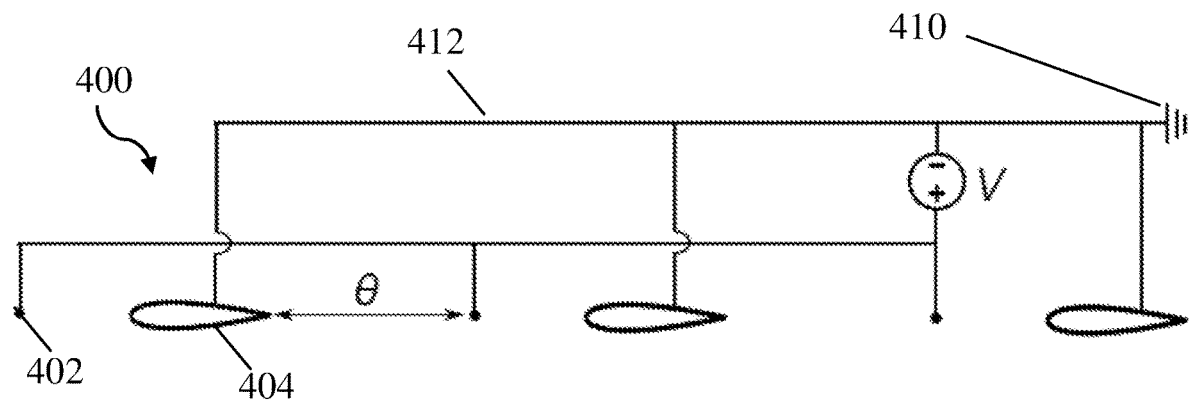
FIG. 4A presents a schematic illustration of a circuit portion of an electroaerodynamic device, according to some embodiments.
Figure 4B:
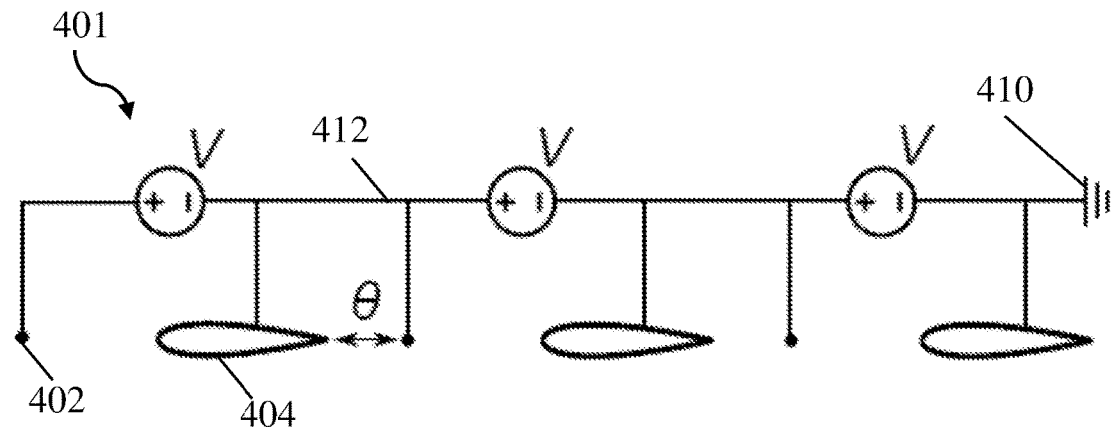
FIG. 4B presents a schematic illustration of an electrical arrangement of an electroaerodynamic device, according to some embodiments.
Figure 4C:
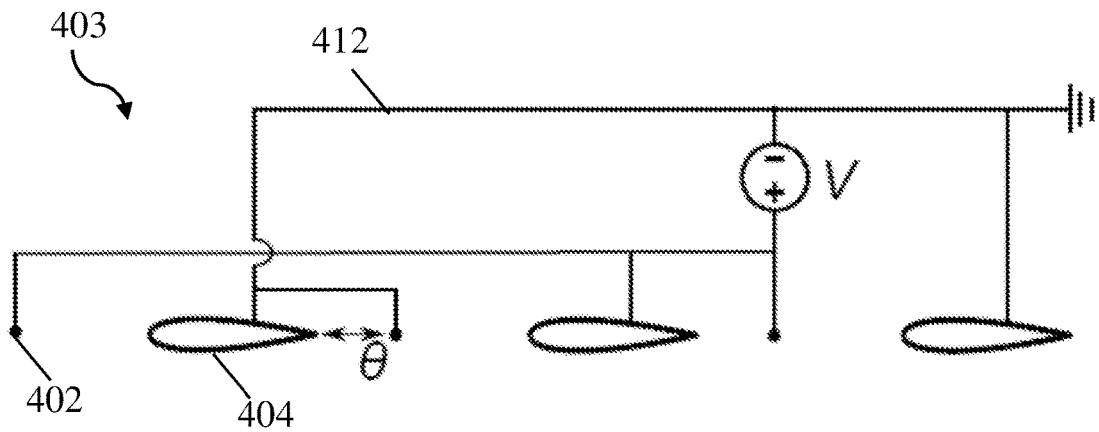
FIG. 4C presents a schematic illustration of an electrical arrangement of an electroaerodynamic device, according to some embodiments.

FIGS. 4A-4C show possible, non-limiting electrical arrangements for electrodes in series. Each electrical arrangement comprises a power supply V, a ground 410, and a series of electrical connections 412 connecting ion sources 404 and ion collectors 404 to voltage sources and/or grounds.

Stages of corona discharge electrodes can be stacked in series in any of a variety of different ways. FIG. 4A shows electrical arrangement 400 in a serial stage geometry. Electrical arrangement 400 only uses one power supply V and results in the production of ions of the same polarity in every stage. In such a configuration, stages may be separated by a distance θ, which may reduce or prevent counter-ionic wind, e.g., the drift of ions produced at an emitter to the collector of the previous stage.

An alternative, non-limiting electrical arrangement 401 is shown in FIG. 4B. Since an ion source 402 and an adjacent, upstream ion collector 404 are at the same potential, electrical arrangement 401 does not result in the production of a counter-ionic wind. Electrical arrangement 401 may therefore permit stages to be placed much closer together (e.g., stages may be separated by a much smaller distance θ) than in an electrical arrangement such as electrical arrangement 400 of FIG. 4A. Electrical arrangement 401 of FIG. 4B results in the production of ions of the same polarity at each stage. As shown in FIG. 4B, electrical arrangement 401 includes one separate power supply V per stage. However, other configurations of electrical arrangement 401 are also possible. For example, electrical arrangement 401 may comprise one single power supply combined with a potential divider.

A third, non-limiting electrical arrangement 403 is shown in FIG. 2C. Electrical arrangement 403 only uses one power supply V, although, of course, additional power supplies could be included. Electrical arrangement 403 alternates the polarity of ions produced in adjacent stages, producing alternating positive and negative corona discharges. Since an ion source 402 and the adjacent, upstream ion collector are at the same potential, electrical arrangement 403 also allows stages to be placed close together in series (e.g., stages may be separated by a much smaller distance θ) than in an electrical arrangement such as electrical arrangement 400 of FIG. 4A.

It should, of course, be understood that other electrical arrangements are also possible. For example, an ion source and an ion collector may be electrically connected via a circuit that is not electrically connected to any other ion source or ion collector. As another example, an ion source and an ion collector may be electrically connected to another ion source and/or another ion collector in the same stage, without being electrically connected to any ion sources or ion collectors in other stages of an electroaerodynamic device. As a third example, an electrical arrangement may electrically connect multiple stages, as shown in FIGS. 4A-4C, but may additionally include more than one ion source and/or more than one ion collector from at least one of the electrically connected stages. The disclosure is not so limited.

Figure 5:
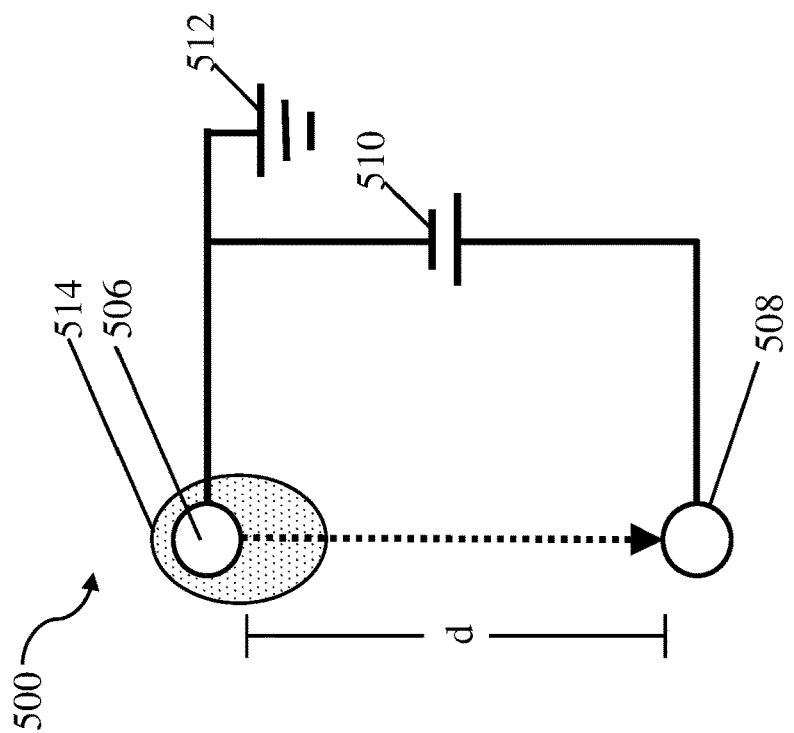
FIG. 5 presents a schematic illustration of an electrical arrangement of an electroaerodynamic device comprising two electrodes, according to some embodiments.

FIG. 5 depicts one, non-limiting embodiment of an electrical arrangement 500 comprising an ion source 506 and an ion collector 508 disposed downstream from ion collector 506. Ion source 506 is spaced from ion collector 508 by a distance d. Ion source 506 comprises a single electrode, electrically connected to ion collector 508 through a power source 510 that is configured to apply a voltage differential between the electrodes. In the depicted embodiment, the output of power source 510 and ion source 506 are connected to the same electrical potential, which is depicted as ground 512 in the FIG. 5. Of course, instances in which the common potential is not a ground potential are also contemplated as the disclosure is not so limited.

During operation, power source 510 applies a voltage differential between ion source 506 and ion collector 508. While power supply 510 has been illustrated as a negative power supply, a positive power supply may also be used as the disclosure is not limited to any particular type of voltage differential applied to the system. At a sufficiently high voltage differential, a self-sustaining gas discharge 514 (a self-sustaining corona discharge), which generates a supply of electrons and ions, is formed at ion source 506. For a positive corona, where ion source 506 is at a positive potential relative to ion collector 508, positive ions travel under the applied electric field toward the negatively charged ion collector as indicated by the arrow. As the ions travel from ion source 506 to ion collector 508, the ions collide with neutral molecules and/or atoms of a bulk fluid and impart at least a portion of their momentum to the bulk fluid. This process generates an ionic wind corresponding to a flow of fluid through the device in the downstream direction and a corresponding thrust force directed in the upstream direction opposite the ion and fluid flow.

In embodiments such as that of FIG. 5, the voltage differential applied to form the corona discharge for ion generation is the same voltage differential used to accelerate the ions for thrust generation. Using the same electric field for both processes may reduce the engineering complexity and the weight of the power system. Additionally, such a device has been used to power both free and tethered flight. However, the thrust of such a system increases with higher applied voltage differential (and equivalently higher average electric field strengths), while thrust-to-power decreases with higher average electric field strength. This may limit the performance of typical corona discharge based electroaerodynamic devices in some embodiments.

Figure 6:
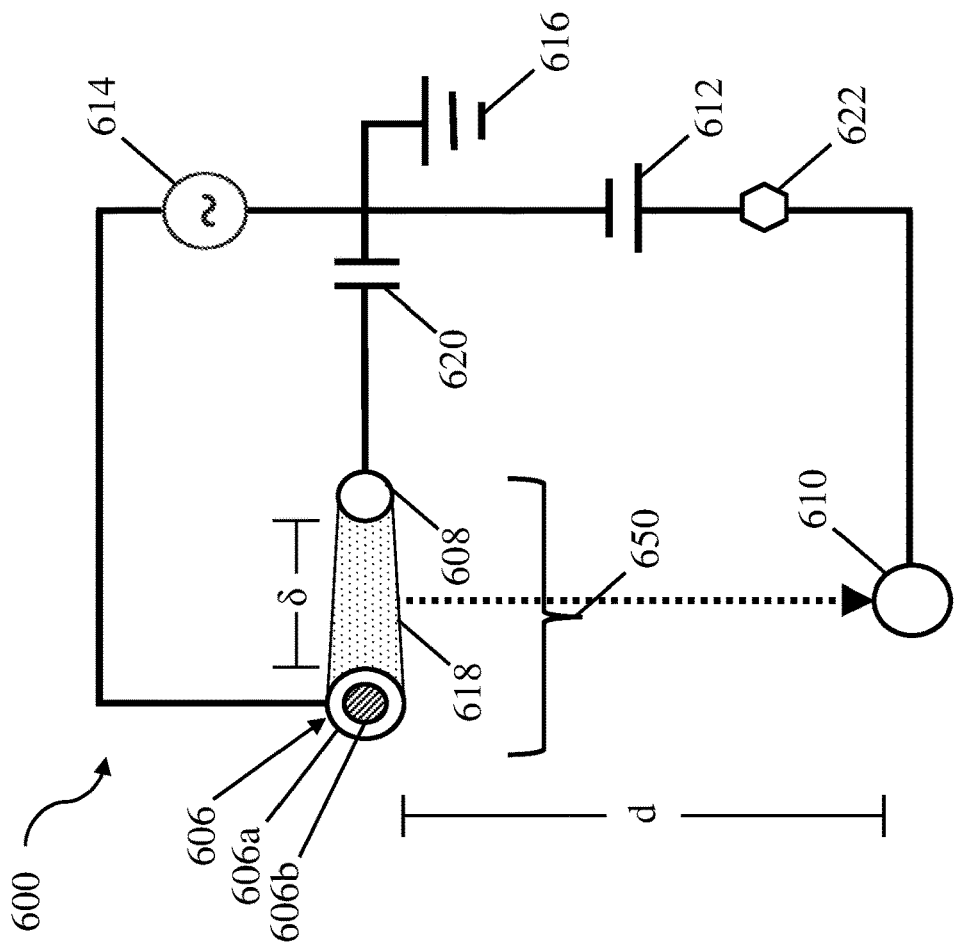
FIG. 6 presents a schematic illustration of an electrical arrangement of an electroaerodynamic device comprising three electrodes, according to some embodiments.

FIG. 6 depicts an embodiment of electrical arrangement 600 that uses dielectric barrier discharge to form ions during normal operation. To perform the desired dielectric barrier discharge, electrical arrangement 600 may include an ion source 650 comprising first electrode 606 and second electrode 608 that are spaced from one another by distance δ. While the electrodes have been depicted as being spaced from one another in a lateral direction relative to a longitudinal axis of the device, the first and second electrode may be spaced from one another in any appropriate direction as the disclosure is not limited in this fashion. First electrode 606 may correspond to a dielectric barrier discharge electrode and second electrode 608 may correspond to an ion emitter in the depicted configuration, such that dielectric barrier discharge 618 is formed between electrodes 606 and 608 to ionize the fluid within the device during nominal operation. Electrical arrangement 600 also includes ion collector 610, which is a third electrode, and which is spaced a distance d downstream from the first and/or second electrodes. Ion collector 610 is configured to apply a voltage differential, and corresponding electric field, relative to first electrode 606 and second electrode 608 to accelerate the ions in the downstream direction. Similar to the above embodiment described in relation to FIG. 5, as the ions move in the downstream direction towards the third collector electrode, the ions collide with neutrally charged molecules and/or atoms within the fluid (e.g. an atmospheric gas) imparting at least a portion of the momentum of the ions to the neutrally charged molecules and/or atoms in the fluid. This generates an ionic wind corresponding to a flow of the fluid in the downstream direction.

In electrical arrangement 600, a first power source 612 is electrically connected to ion collector 610 and a common electrical potential represented as a ground 616 in FIG. 6. While first power source 612 has been illustrated as a negative power supply, it should be understood that any appropriate power supply including a positive power supply may be used as the disclosure is not limited to the specific magnitude or directionality of the voltage differentials applied to the electrodes. In the depicted embodiment, second electrode 608 and a second power source 614 may also be electrically connected to the ground or other common potential. Separately, second power source 614 is electrically connected to first electrode 606. Thus, a first time-varying voltage, $V_{AC}$, may be applied to first electrode 606 relative to second electrode 608 and ground 616. A second voltage, $V_{DC}$, which may be a substantially constant voltage, may be applied to the third collector electrode relative to the ground or other common potential. Additionally, a ground voltage, $V_G$, may be applied to second electrode 606 by the ground or other common potential, though embodiments in which a capacitor such as capacitor 620 is electrically connected in series between the second electrode and the ground or other common potential are also contemplated, in which case, the voltage applied to the second electrode would be a combination of $V_G$ and a voltage of the capacitor $V_{Cap}$.

In view of the above, a time-varying voltage differential applied between first electrode 606 and second electrode 608 causes the fluid located between the electrodes to ionize via dielectric barrier discharge 618 as the voltage cyclically changes during operation. This voltage differential may correspond to a difference between the voltage applied to the first electrode $V_{AC}$ by the second power source and the combination of the ground voltage $V_G$ and the capacitor voltage $V_{Cap}$ where present. Given the large voltage difference between ion collector 610 and ion source 650, used to accelerate the ions, the voltage differential used for accelerating the ions may be approximated as the second voltage $V_{DC}$ or an average of the difference between the voltage of ion collector 610 with first electrode 606 and second electrode 608. However, a more specific voltage differential between the first electrode and the third collector electrode may correspond to the difference between $V_{AC}$ and $V_{DC}$. Similarly, the voltage differential between the second electrode and the third collector electrode may correspond to the difference between $V_{DC}$ and the combination of the ground voltage $V_G$ and capacitor voltage $V_{Cap}$.

While different types of arrangements for the ion sources and ion collectors are shown relative to FIGS. 5 and 6 for use with the various embodiments disclosed herein, it should be understood that the various devices and methods may be used with any appropriate type of ion source and ion collector as the disclosure is not so limited.

In some embodiments, a ducted electroaerodynamic device is a thruster of an aircraft. In such an application, it may be desirable for a duct of an electroaerodynamic device to be configured to act as a lifting surface. For example, an enclosure of a duct may be, or at least partially comprise, an airfoil formed therein. Of course, in other embodiments, a thruster is not configured to act as a lifting surface, and provides minimal lift. FIGS. 7-11 present perspective, schematic illustrations of non-limiting aircraft 700 comprising electroaerodynamic devices that are configured to act as lifting surfaces and electroaerodynamic devices that are not configured to act as lifting surfaces. Each thruster includes at least one ion source and at least one ion collector as described above, but ion sources and ion collectors are not represented in FIGS. 7-11.

Figure 7:
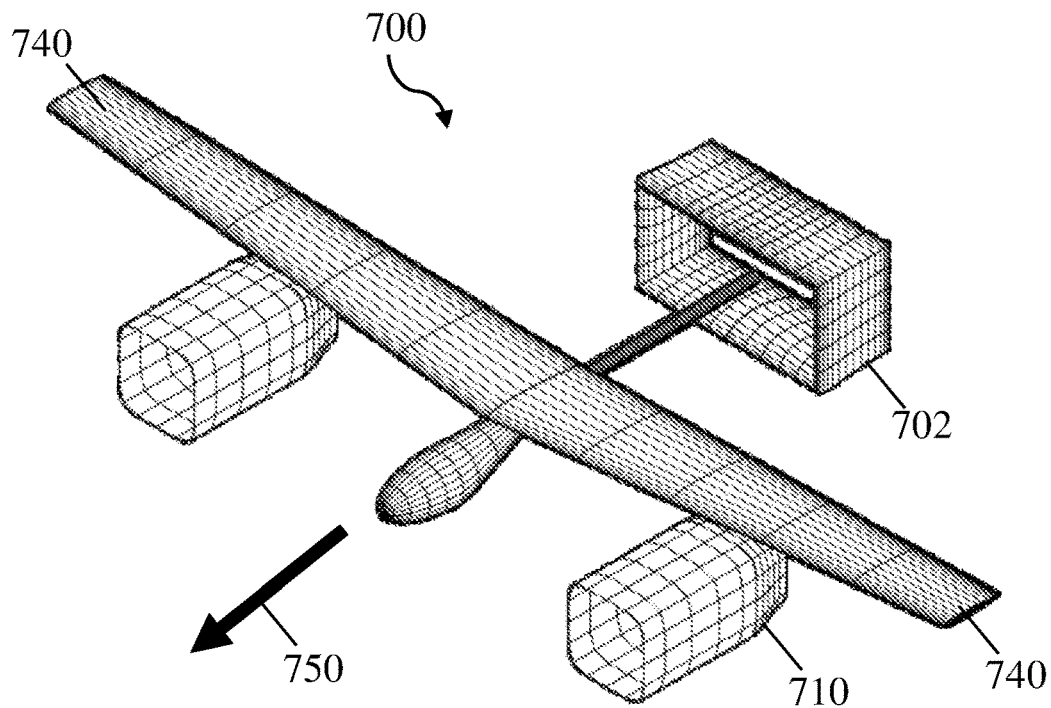
FIG. 7 presents a schematic, perspective illustration of an aircraft comprising electroaerodynamic thrusters, according to some embodiments.
Figure 8:
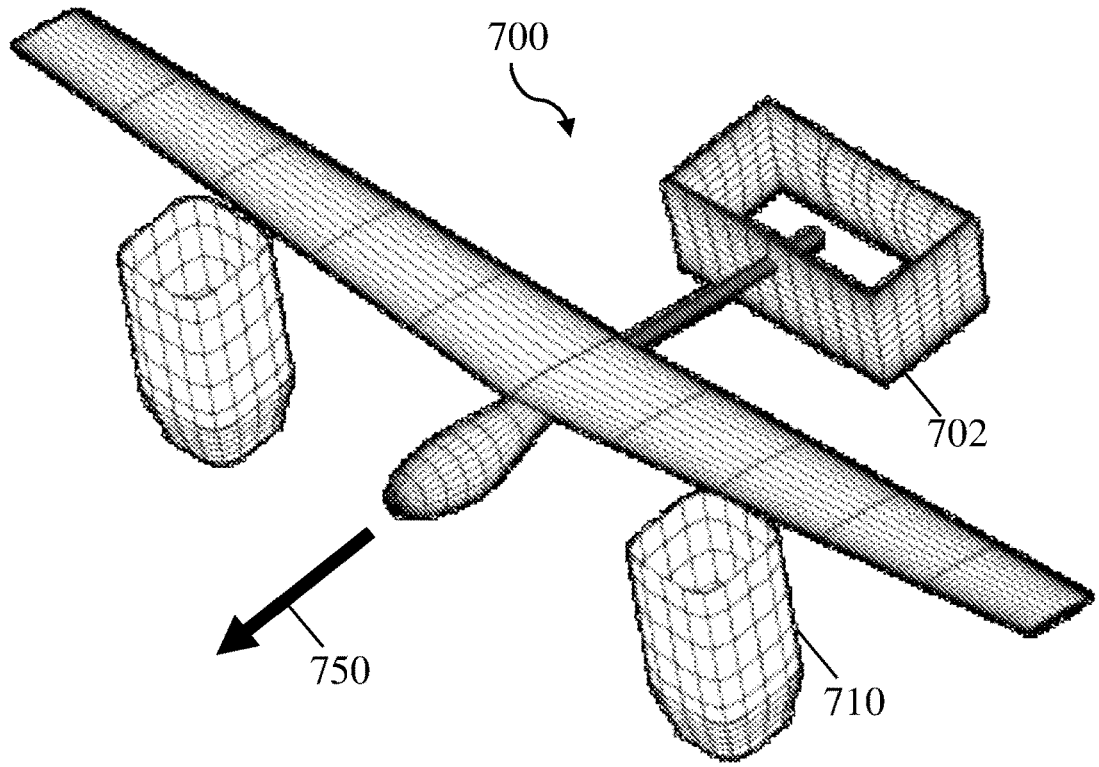
FIG. 8 presents a schematic, perspective illustration of an aircraft comprising electroaerodynamic thrusters, according to some embodiments.

FIG. 7 illustrates aircraft 700, which comprises wings 740 that are configured to act as primary lifting surfaces. Aircraft 700 is configured to travel in a forward direction 750, propelled by thrusters 710, which have a nozzled geometry and are not configured to act as lifting surfaces, and by thruster 702, which is configured to act as a lifting surface. During forward motion in direction 750, thrusters 710 and 702 are configured such that their downstream direction opposes forward direction 750, so that they can provide thrust to aircraft 700. However, FIG. 8 illustrates a configuration of aircraft 700 comprising thrusters 702 and 710, which are oriented in a different orientation, perpendicular to a forward direction 750 of the aircraft. This change in thruster orientation may be useful for facilitating take-off and landing of the aircraft. It should be understood that orientation of a thruster may also determine whether the thruster is configured to act as a lifting surface. Referring again to FIG. 8, the thrusters may propel the aircraft but thruster 710 does not necessarily act as a lifting surface because it is perpendicular to the forward direction of the aircraft, and it cannot function as an airfoil.

Figure 9:
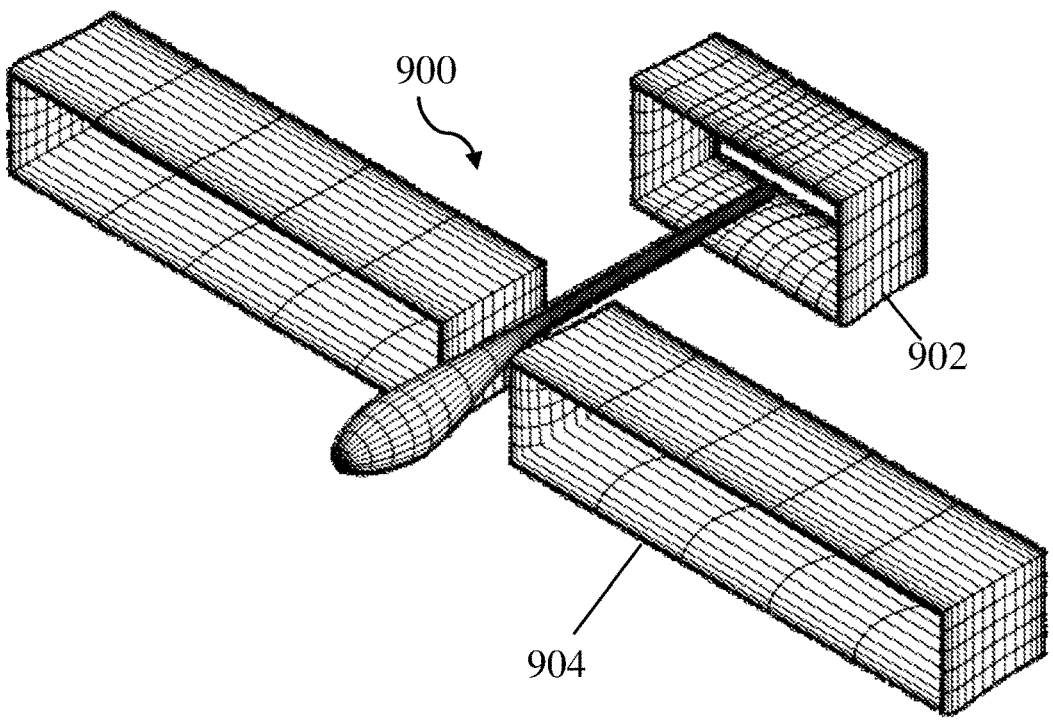
FIG. 9 presents a schematic, perspective illustration of an aircraft comprising electroaerodynamic thrusters, according to some embodiments.
Figure 10:
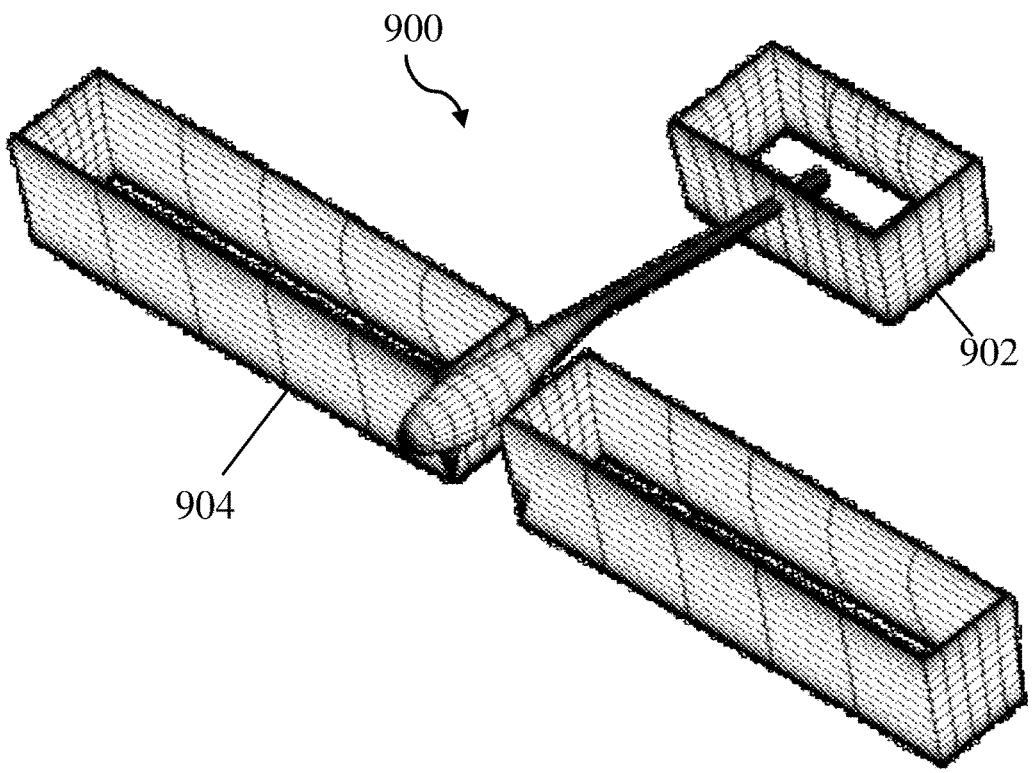
FIG. 10 presents a schematic, perspective illustration of an aircraft comprising electroaerodynamic thrusters, according to some embodiments.

FIGS. 9 and 10 present similar examples, where an aircraft 900 comprises thrusters 902 and 904, which are configured to act as lifting surfaces. Thruster 902 is analogous to thruster 702 of FIGS. 7-8. In addition to acting as thrusters, thrusters 904 are the primary lifting surfaces of aircraft 900. As shown, thrusters 904 may be used as a replacement for conventional aircraft wings, which may permit thrust to be increased without significant losses in efficiency. Such an embodiment may be advantageous, since every lifting surface of aircraft 900 also generates thrust. Like the thrusters of FIGS. 7-8, an angle of thrusters 902 and 904 may be changed to facilitate takeoff and landing.

Figure 11:
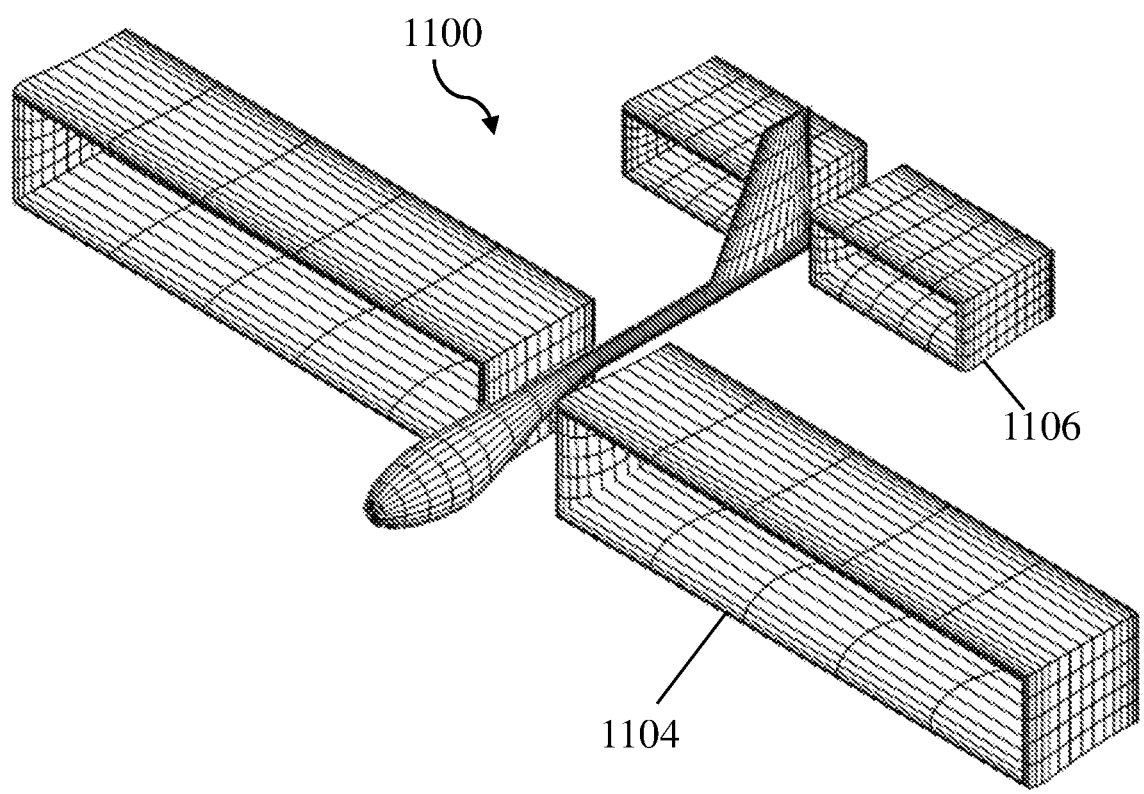
FIG. 11 presents a schematic, perspective illustration of an aircraft comprising electroaerodynamic thrusters, according to some embodiments.

FIG. 11 is similar to FIGS. 9-10, illustrating an aircraft 1100 comprising thrusters 1104 that, like thrusters 904 of FIG. 9, double as lifting surfaces. Aircraft 1100 further comprises two additional tail-thrusters 1106 which double as lifting surfaces. Aircraft 1100 thus serves as an example, demonstrating that every lifting surface of a traditional aircraft can, according to some embodiments, be replaced by a thruster while still providing lift.

The following examples are intended to illustrate certain embodiments of the present disclosure, but do not exemplify the full scope of the disclosure.

EXAMPLE 1

The performance of a ducted thruster such as that of FIG. 1 depends on the duct geometry. This example demonstrates the role of geometry in thruster performance based on a 1-D momentum method described below.

In a ducted thruster as in FIG. 1, the flow between stations 1 and 2 and between 3 and 4 was assumed to be quasi-1-D, steady, incompressible, inviscid and isentropic for the purpose of modeling. Under such conditions, Bernoulli's principle required that $$\begin{cases} p_1 + \frac{1}{2}\rho v_1^2 = p_2 + \frac{1}{2}\rho v_2^2 \\ p_2 + \Delta p + \frac{1}{2}\rho v_3^2 = p_4 + \frac{1}{2}\rho v_4^2 \end{cases} \quad (2.1)$$

where $p_x$ was the static pressure at station x, $\rho$ was the air mass density, $v_x$ was the axial velocity at station x, and $\Delta p$ represents the static pressure rise across the EAD stages between stations 2 and 3. From conservation of mass, the flow velocity through the constant-area portion of the thruster was $$v_2 = v_3 = v_4 \frac{A_4}{A_2} \quad (2.2)$$

where $A_x$ was the cross-sectional area at station x. Solving Eq. 2.1 for the far wake velocity $v_4$, yielded:

$$v_4 = \sqrt{v_1^2 + \frac{2(\Delta p + p_1 - p_4)}{\rho}} = \sqrt{v_1^2 + \frac{2\Delta p}{\rho}}, \quad (2.3)$$

since station 4 was defined as the point where $p_1=p_4$.

To close these equations, it was assumed that the properties at station 4 were the same as the properties at station e, the nozzle exit. This implied that $A_4=A_e$ and, as a result, that the nozzle exit pressure was atmospheric, $p_e=p_4=p_1$. The assumption that the properties at station 4 were the same as the properties at station e led to what Sacks and Burnell referred to as "simple momentum theory". It was assumed that the thrusters had an almost constant wake diameter downstream of the nozzle exit, when the freestream conditions were static ($v_1=0$). Under the assumption of constant wake diameter downstream of the nozzle exit, the nozzle exit velocity was given by Eq. 2.3.

The thrust density $$\frac{F}{A_2},$$

was $$\frac{F}{A_2} = \frac{\dot{m}(v_e - v_1) + A_e(p_e - p_1)}{A_2} = \rho v_4 (v_4 - v_1)\phi, \quad (2.4)$$

where $\dot{m} = \rho A_4 v_4$ was the mass flow rate through the thruster and $$\phi = \frac{A_e}{A_2}$$

was the nozzle area ratio. In an unducted thruster, the far wake area $A_4$ was unknown. To model the unducted thruster, the system of equations was closed with Eq. 2.5

$$F = \dot{m}(v_4 - v_1) = \Delta p A_2. \quad (2.5)$$

Equation 2.5 did not hold in general when the thruster was ducted, due to the contribution to thrust from the pressure forces acting on the duct. In the following analysis, it was assumed that the thruster had a duct with an inlet and a nozzle, and that $A_4 = A_e$. This analysis was extended to unducted thrusters through Eq. 2.5.

Several simplifying assumptions were made in the 1-D momentum theory model and EAD stage models considered in the previous sections. The aim of this example was not to provide highly accurate performance predictions. Rather, this example generally illustrated the potential of multi-staged ducted (MSD) thrusters with respect to single-stage EAD thrusters.

The equations governing the performance of MSD thrusters with ideal stages (Eqs. 2.2, 2.18 and 2.40) and with corona discharge stages (Eqs. 2.2, 2.35, 2.37 and 2.40, described in greater detail below) were solved simultaneously using a Newton's method solver in which the Jacobian matrix was evaluated with a finite-difference method. The nozzle area ratio was selected such that $\phi = \min(1, \phi|_{opt})$, where $\phi|_{opt}$ was the nozzle area ratio that maximized the thrust density for given loss coefficient, freestream velocity $v_1$, number of stages and EAD pressure rise $\Delta p_E$. The nozzle area ratio was limited to 1 because flow separation in the nozzle was theoretically possible for area ratios above that. A constant mobility $|\mu| = 2 \times 10^{-4}$ m$^2$ V$^{-1}$ s$^{-1}$ was assumed. Air density was kept constant and equal to $\rho = 1.23$ kg m$^{-3}$.

Figures 12A, 12B, 12C:
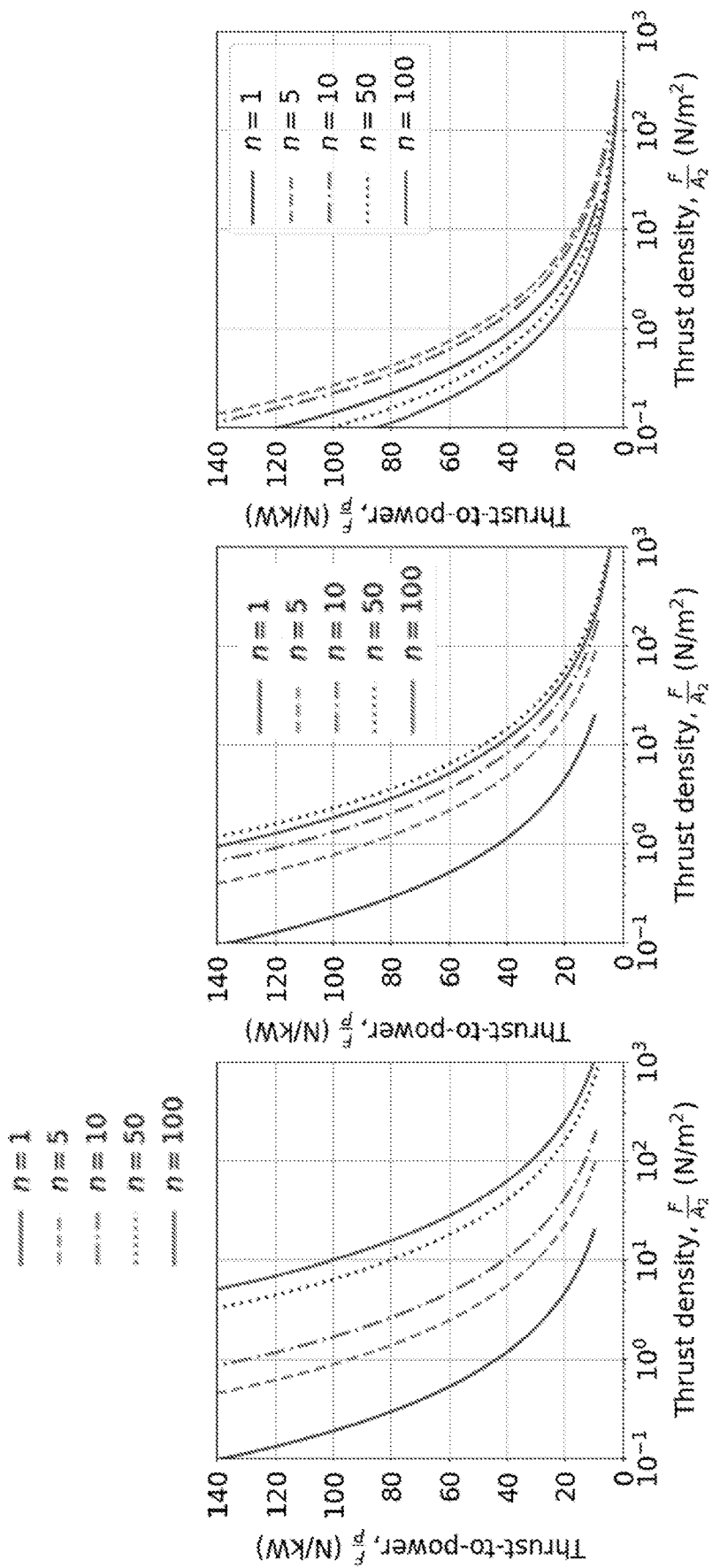
FIG. 12A presents simulated thruster properties of electroaerodynamic devices, according to some embodiments.
FIG. 12B presents simulated thruster properties of electroaerodynamic devices, according to some embodiments.
FIG. 12C presents simulated thruster properties of electroaerodynamic devices, according to some embodiments.

FIG. 12A shows how the thrust-to-power ratio of an ideal MSD thruster, with a uniform current density across any given cross-sectional area in the ion acceleration region, changed with the thrust density at static conditions ($v_1=0$ m/s). The EAD stages were assumed to be space-charge limited ($\bar{\rho} \to \infty$) and the voltage per unit gap spacing was varied in the range $$0 \le \left|\frac{V}{d}\right| \le 1 \text{ kV/mm}.$$

Results were parametrized by the voltage-to-gap spacing ratio, $$\left|\frac{V}{d}\right|.$$

The EAD stages were assumed to be space-charge limited and repeating. Higher voltage-to-gap spacing ratios might have been possible, but this upper limit was chosen because electrical breakdown can occur above it. The results showed that thrust densities on the order of 100 N/m$^2$ were achievable; this thrust density was two orders of magnitude higher than both the estimated maximum thrust density previously calculated or observed for an electroaerodynamic thruster. FIGS. 12B-12C are similar to FIG. 12A, but show different loss coefficients ($K_L$). Decreasing the loss coefficient was observed to improve the thrust-to-power ratio for given thrust density and number of stages. In FIGS. 3B-3C, it was observed that using a plurality of stages resulted in an increased thrust-to-power, but that using too many stages reduced this effect. For example, in FIG. 12B with $K_L=0.01$, the optimal number of stages among the cases shown was n=50; however, in FIG. 12C with $K_L=0.1$, the optimal number of stages among those shown was n=5. This showed that a plurality of stages was beneficial in the modeled embodiments, but that the number of stages may be related to the loss coefficient of the thruster.

Figures 13A, 13B, 13C:
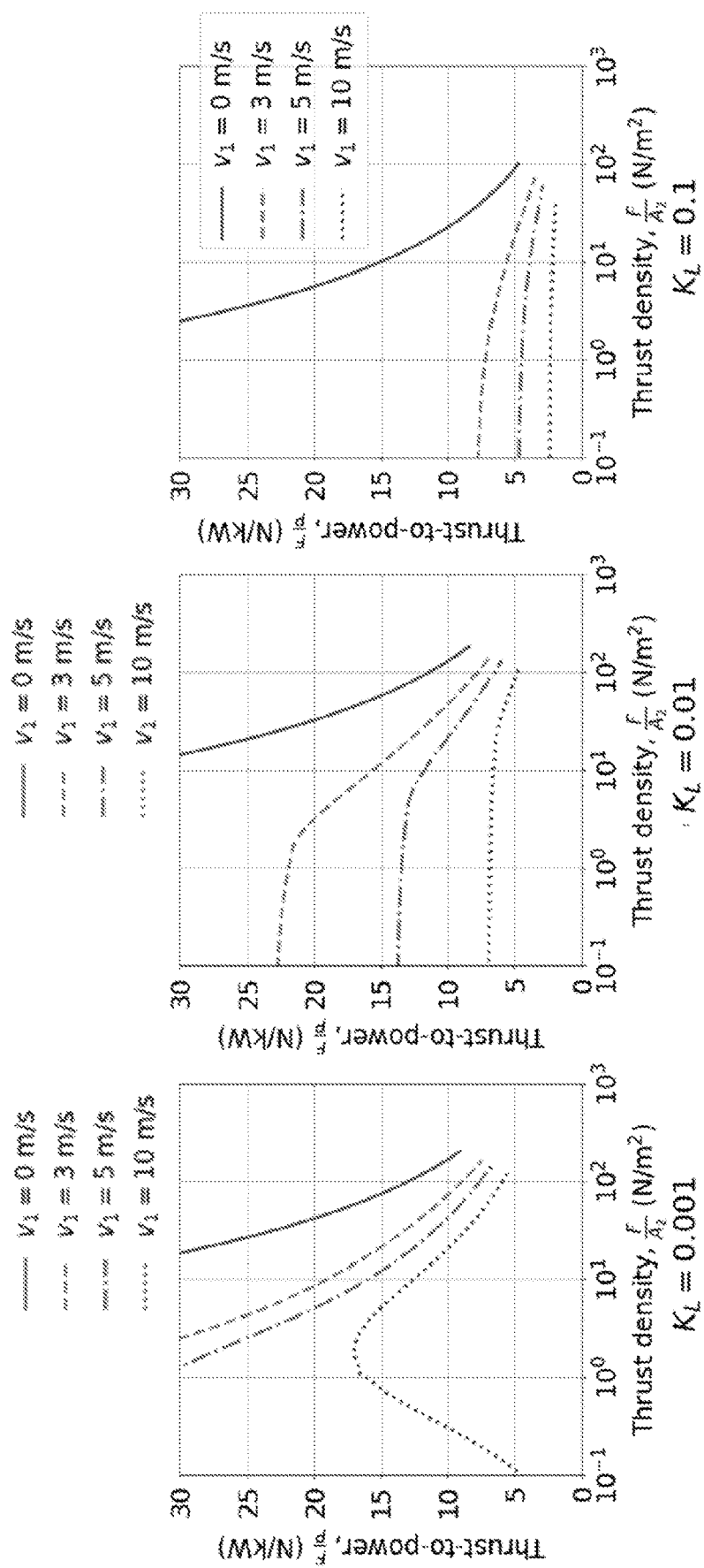
FIG. 13A presents simulated thruster properties of electroaerodynamic devices, according to some embodiments.
FIG. 13B presents simulated thruster properties of electroaerodynamic devices, according to some embodiments.
FIG. 13C presents simulated thruster properties of electroaerodynamic devices, according to some embodiments.

FIGS. 13A-13C show the effect of changing the freestream velocity on the performance of an MSD thruster with n=10 stages. The thrust-to-power provided by the thruster at a given thrust density was reduced as the freestream speed increased, due to higher pressure losses in the thruster. FIGS. 13A-13C also show that reducing the loss coefficient improved the performance of MSD thrusters: at a freestream velocity of $v_1=10$ m/s, a thruster with $K_L=0.001$ could have delivered a thrust density of $$\frac{F}{A_2} = 10 \text{ N/m}^2$$

at a thrust-to-power ratio of $$\frac{F}{P} = 12.5 \text{ N/kW}.$$

However, when $K_L=0.1$ was used in the model, the thrust-to-power ratio at the same thrust density and freestream velocity was reduced to $$\frac{F}{P} = 2.2 \text{ N/kW}.$$

Figures 14A, 14B, 14C:
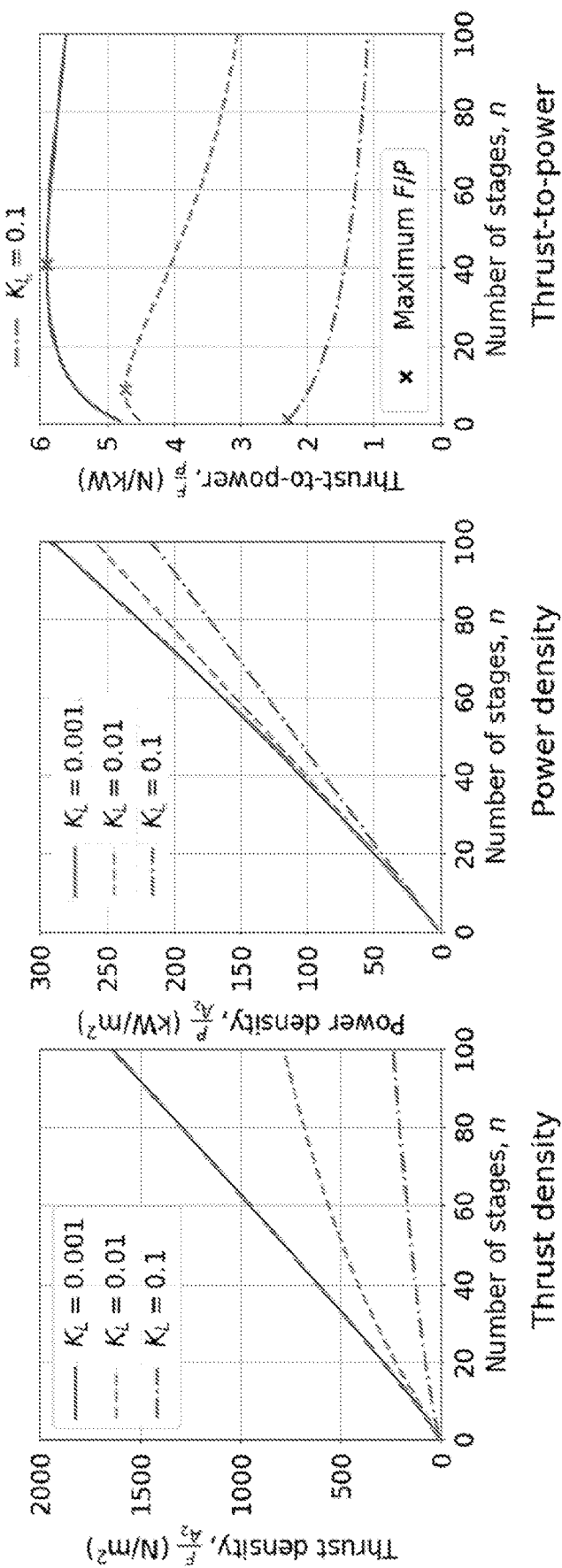
FIG. 14A presents simulated thruster properties of electroaerodynamic devices, according to some embodiments.
FIG. 14B presents simulated thruster properties of electroaerodynamic devices, according to some embodiments.
FIG. 14C presents simulated thruster properties of electroaerodynamic devices, according to some embodiments.

FIGS. 14A-14C show the thrust density, power density (total power draw per unit frontal area) and thrust-to-power ratio of an MSD thruster with a freestream velocity $v_1=10$ m/s and a voltage per unit electrode gap spacing $|V|/d=1$ kV/mm against the number of EAD stages. FIG. 14A shows that the thrust density of an MSD thruster was dependent on the loss coefficient: for a loss coefficient of $K_L=0.001$, the thrust density scales approximately linearly with the number of stages for $n \leq 100$; however, for $K_L=0.01$ and $K_L=0.1$, the thrust density increases with number of stages with diminishing returns. FIG. 14C shows that for $0.001 \leq K_L \leq 0.01$, there was a number of stages $n>1$ that provides maximum thrust-to-power. If $K_L=0.1$, the maximum thrust-to-power was obtained at $n=1$. FIG. 14B shows the power demand per unit area of an ideal EAD thruster. For a given number of stages, the power draw was a function of the loss coefficient due to the dependency of current density on the velocity $v_2$.

These results demonstrate the advantages of multi-stage and ducted thrusters such as those described herein.

EXAMPLE 2

An idealized 1-D model of a constant-area EAD device was considered. The device consisted of several ion acceleration stages, each containing an ion source (where ions were injected) and an ion collector (where ions were neutralized) separated by an ion drift region across which a voltage was applied, as shown in FIG. 1. In order for conditions to be one-dimensional, the ion sources at the emitting electrodes of this device were assumed to produce volumetric ionization, such that they delivered a uniform charge density across the duct cross-section at the emitter. Assuming that only one polarity of ions was present at any given stage, the current density, j, in a stage's ion drift region was uniform across the cross-section and was modeled as:

$$j = \rho_c(v_B + \mu E), \quad (2.6)$$

where $v_B$ was the bulk velocity of the neutral fluid, $\rho_c$ was the charge density, E was the electric field, and $\mu$ was the ion mobility. Note that the mobility was defined such that $\mu = \text{sign}(q)|\mu|$, where $\text{sign}(q)$ was the sign function applied to the charge of the ions in the drift region, such that the mobility was positive when ions had a positive charge and negative when ions had a negative charge. The mobility was assumed to be constant for the range of electric fields used in EAD devices. The terms on the right-hand side of Eq. 2.6 represented convective and ion drift currents, respectively.

The flow was assumed to be steady and incompressible, such that the system was governed by conservation of mass, momentum and charge, and Gauss's law. In the drift region between an emitter and a collector, these were expressed in 1-D as $$\frac{d}{dx}\begin{bmatrix} v_B \\ p \\ \rho_c(v_B + \mu E) \\ E \end{bmatrix} = \begin{bmatrix} 0 \\ \rho_c \\ 0 \\ \frac{\rho_c}{\varepsilon} \end{bmatrix} \quad (2.7)$$

where x was a stage coordinate starting at the emitter and $\varepsilon$ was the permittivity of the medium.

The system was closed with the condition that $$V = \int_0^d E(x) dx, \quad (2.8)$$

where V was the DC voltage applied across the stage and d, the gap spacing, was the distance between the ion source and the ion collector.

The thruster inlet conditions were that $v_B = v_2$, $p|_{x=0} = p_2$ (at the first stage only) and that $E|_{x=0} = E_0$, where $E_0$ was the electric field at the emitter. If the thruster was multi-staged, each stage had a set of emitting and collecting electrodes, across which a voltage was applied. The outlet pressure of one stage was assumed to be the inlet pressure of the next stage. Since the thruster was assumed to have constant cross-sectional area, the bulk velocity was constant due to mass conservation.

Pressure losses across a stage, $\Delta p_L$, were modeled with:

$$\Delta p_L = -\frac{1}{2}\rho v_B^2 K_L, \quad (2.9)$$

where $K_L$ was a loss coefficient that depended on the stage geometry. In general, pressure losses were caused by emitter and collector drag, as well as by skin friction forces on the duct.

Combining Eqs. 2.6 and 2.7, it was shown that the electric field distribution between the emitting and collecting electrodes was given by $$E(x) = \text{sign}(q)\left[\frac{2jx}{\varepsilon\mu} + \left(E_0 + \frac{v_B}{\mu}\right)^2\right]^{\frac{1}{2}} - \frac{v_B}{\mu}. \quad (2.10)$$

Substituting Eq. 2.10 into Eq. 2.8 resulted in an implicit equation for the current density, $$V = \int_0^d \left(\text{sign}(q)\left[\frac{2jx}{\varepsilon\mu} + \left(E_0 + \frac{v_B}{\mu}\right)^2\right]^{\frac{1}{2}} - \frac{v_B}{\mu}\right) dx. \quad (2.11)$$

Eq. 2.11 defined the current characteristics of this 1-D EAD device: it was the relation between the voltage and current density. Eq. 2.11 has a simple analytical solution for the case when $v_B = 0$ and $E_0 = 0$. This was known as the Mott-Gurney law and the current density in this case, $j_{MG}$, was given by $$j_{MG} = \frac{9}{8}\varepsilon\mu\frac{V^2}{d^3}. \quad (2.12)$$

A general analytical solution for the current characteristics can was used for any electric field at the emitter and any bulk velocity. This took the form $$\bar{J} = \frac{j}{j_{MG}} = \bar{J}_1(\alpha, \bar{v}), \quad (2.13)$$

where $\bar{J}$ was the non-dimensional current density;

$$\alpha = \frac{E_0 d}{V}$$

was the non-dimensional electric field at the emitter;

$$\bar{v} = \frac{v_B d}{\mu V}$$

was the non-dimensional bulk fluid velocity, also referred to as the electric slip number; and $\bar{J}_1(\alpha, \bar{v})$ was a function of $\alpha$ and $\bar{v}$.

This analysis assumed that the electric field at the emitter was known. Since the electric field at the emitter was usually assumed to remain constant after corona discharge inception, the model in Eq. 2.13 was also appropriate for corona discharge devices. Given that the electric field and charge density at the emitter were related through Eq. 2.6 as $$E_0 = \frac{1}{\mu}\left(\frac{j}{\rho_{c,0}} - v_B\right), \quad (2.14)$$

Eq. 2.13 can also be extended for the case when the charge density at the emitter, $\rho_{c,0}$, was set. This boundary condition was more appropriate for devices with an ion source decoupled from the acceleration stage, in which $\rho_{c,0}$ could be controlled independently. In this case, the current characteristics took the form:

$$\bar{J} = \frac{j}{j_{MG}} = \bar{J}_2(\bar{\rho}, \bar{v}), \quad (2.15)$$

where $$\bar{\rho} = \frac{\rho_{c,0} d^2}{\varepsilon V}$$

represented a non-dimensional charge density at the emitter, also referred to as the electric source number; and $\bar{J}_2(\bar{\rho}, \bar{v})$ was a function of $\bar{\rho}$ and $\bar{v}$. In the case when $\bar{\rho}\to\infty$, the current density tended to:

$$j\big|_{\bar{\rho}\to\infty} = \frac{9}{8}\varepsilon\mu\frac{\left(V + \frac{v_B d}{\mu}\right)^2}{d^3} = (1+\bar{v})^2 j_{MG}. \quad (2.16)$$

The current density in Eq. 2.16 represented the space-charge limited current for non-zero bulk velocities.

Integrating the momentum equation in Eq. 2.7 across one stage and adding the pressure loss term resulted in an expression for the static pressure rise across the stage, $\Delta p_{stage}$:

$$\Delta p_{stage} = \int_0^d \frac{dp}{dx}dx + \Delta p_L = \int_0^d \rho_c E dx - \frac{1}{2}\rho v_B^2 K_L = \Delta p_E - \frac{1}{2}\rho v_B^2 K_L. \quad (2.17)$$

The pressure rise due to electrostatic forces across a stage, $\Delta p_E$, was given by:

$$\Delta p_E = \int_0^d \rho_c E dx = \frac{jd}{\mu} - \frac{\varepsilon v_B}{|\mu|}\left[\left(\frac{2jd}{\varepsilon\mu} + \left(E_0 + \frac{v_B}{\mu}\right)^2\right)^{\frac{1}{2}} - \left|E_0 + \frac{v_B}{\mu}\right|\right]. \quad (2.18)$$

In Eq. 2.18, if $v_B=0$, the electrostatic pressure rise reduces to $$\Delta p_E\big|_{v_B=0} = \frac{jd}{\mu}. \quad (2.19)$$

If $v_B=0$ and $E_0=0$, Eq. 2.12 can be substituted into Eq. 2.19 to obtain an explicit expression for the electrostatic pressure rise as a function of the electrical parameters, $$\Delta p_E\big|_{v_B=0,E_0=0} = \frac{j_{MG}d}{\mu} = \frac{9}{8}\varepsilon\frac{V^2}{d^2}. \quad (2.20)$$

Alternatively, if the bulk velocity was allowed to vary but the charge density at the emitter was such that $\bar{\rho}\to\infty$, the electrostatic pressure rise could be expressed as:

$$\Delta p_E\big|_{\bar{\rho}\to\infty} = \frac{j_{MG}d}{\mu}(1+\bar{v})\left(1-\frac{\bar{v}}{3}\right), \quad (2.21)$$

which represented the pressure rise under space-charge limited conditions for non-zero bulk velocities.

The power per unit cross-sectional area required to accelerate the ions across the gap was $$\frac{P}{A} = jV.$$

The pressure rise-to-power ratio $\Theta$ of a stage was then defined as:

$$\Theta = \frac{\Delta p_E}{P/A} = \frac{\Delta p_E}{jV}, \quad (2.22)$$

and was a measure of the static efficiency of the stage analogous to the thrust-to-power ratio of an unducted EAD thruster. If $v_B=0$, the ratio $\Theta$ was:

$$\Theta\big|_{v_B=0} = \frac{\Delta p_E\big|_{v_B=0}}{jV} = \frac{d}{\mu V}. \quad (2.23)$$

Defining a non-dimensional electrostatic pressure rise $\bar{p}$ $$\bar{p}(a, \bar{v}) = \frac{\Delta p_E}{\Delta p_E\big|_{v_B=0,E_0=0}} = \frac{\Delta p_E}{\frac{j_{MG}d}{\mu}}, \quad (2.24)$$

the EAD pressure rise of a stage can be related to $\Theta$ through $$\Theta = \frac{1}{|\mu|}\sqrt{\frac{9\varepsilon}{8}}\frac{\bar{p}^{3/2}}{J}\frac{1}{\sqrt{\Delta p_E}}. \quad (2.25)$$

Equation 2.25 showed that there was a fundamental trade-off between $\Delta p_E$ and $\Theta$: a greater pressure rise (which results in higher thrust) implied a lower pressure rise-to-power (lower efficiency). This motivated the use of multi-staged devices: using multiple ion acceleration stages decoupled the overall pressure rise and the pressure rise-to-power ratio. Equation 2.25 also showed no direct dependency on the electrode gap spacing d. This meant that small gap spacings were preferable because they led to more compact devices and lower DC voltage requirements. Since current density scaled as $$j \propto \frac{1}{d^3},$$

the minimum gap distance may, in practice, be limited by the current that can be delivered by the ion source, or by engineering limits.

In this section, a stage geometry comprising an array of wire ion emitters and airfoil ion collectors was considered, in which parallel electrode pairs were separated by a distance $\Delta$ as shown in FIG. 3. Stages were separated by a distance $\theta$ to avoid counter-ionic wind, e.g., the drift of ions from an ion source to an upstream ion collector.

When there were no interactions between parallel electrode pairs ($\Delta \to \infty$), the current produced by an emitter/collector pair in a wire-to-airfoil geometry in stationary air was given by:

$$I_c|_{v_B \to 0, \frac{\Delta}{d} \to \infty} = \begin{cases} 0, & |V| < |V_0| \\ C_0 \varepsilon \mu \frac{V(V-V_0)}{d^2} b, & |V| \geq |V_0| \end{cases} \quad (2.26)$$

where b was the electrode span, and $C_0$ was a non-dimensional function of electrode geometry. The term $V_0$ denoted the corona inception voltage, which was a function of the gap spacing and the electrode geometry. Experimental data showed that the corona discharge current was a function of both the bulk fluid velocity and the distance between parallel electrode pairs, $\Delta$. The exact form of this interaction was not previously known. Here, a model for the current between an emitter/collector pair of the form $$I_c = I_c|_{v_B \to 0, \frac{\Delta}{d} \to \infty} f\left(\frac{\Delta}{d}\right) g(\bar{v}), \quad (2.27)$$

used, where f and g were non-dimensional functions of, respectively, the ratio of interelectrode distance-to-gap spacing, $$\frac{\Delta}{d},$$

and the non-dimensional velocity, $\bar{v}$. The corresponding average current density for $|V| \geq |V_0|$ was $$j = \frac{I_c}{\Delta b} = C_0 \varepsilon \mu \frac{V(V-V_0)}{d^3} \frac{d}{\Delta} f\left(\frac{\Delta}{d}\right) g(\bar{v}). \quad (2.28)$$

The dependency of current on bulk velocity depends on the electrode orientation: in the case when the emitter was positioned at the front of the airfoil's leading-edge, current increased with velocity. For the purposes of this example, it was assumed that the current scales with bulk velocity according to $$g(\bar{v}) = (1+\bar{v})^2. \quad (2.29)$$

Equation 2.29 assumes that the current in a corona discharge scales with velocity in the same manner as the 1-D space-charge limited current.

A single stage device in static conditions with several sets of parallel emitting and collecting electrodes spaced at a distance $\Delta$ could be fit by:

$$\frac{F_c}{A} = \frac{I_c|_{v_B \to 0, \frac{\Delta}{d} \to \infty}}{\mu b} \frac{d}{\Delta}(1 - 2e^{-4.0\Delta/d}), \quad (2.30)$$

where A was the thruster cross-sectional area and $F_c$ was the thrust force produced by the unducted corona discharges.

The thrust force produced by an unducted wire-to-airfoil corona discharge thruster in static air, $F_c|_{v_B \to 0}$, was given by:

$$F_c|_{v_B=o} = \frac{I_c|_{v_B \to 0} d}{\mu}. \quad (2.31)$$

From Eq. 2.27, Eq. 2.30 and Eq. 2.31, it was inferred that the function f, which accounts for the interaction between parallel electrodes, could be modeled as $$f\left(\frac{\Delta}{d}\right) = 1 - 2e^{-4.0\Delta/d}, \quad (2.32)$$

which took an expected functional form.

Equation 2.30 was developed for an unducted, single-stage EAD thruster. In the subsequent analysis, it was assumed that Eq. 2.30 was also applicable to multi-staged ducted EAD devices, with a pressure rise across a thruster stage of $$\Delta p_E = \frac{F_c}{A}$$

as per Eq. 2.5.

The exact effect of bulk velocity on the pressure generation of corona discharge devices was not known. Here, it was assumed that the pressure rise scaled with bulk velocity in the same way as in the space-charge limited case in an ideal 1-D device, similarly to what was assumed for the current density:

$$\Delta p_E = \Delta p_E|_{v_B=o} h(\bar{v}), \quad (2.33)$$

where:

$$h(\bar{v}) = (1+\bar{v})\left(1 - \frac{\bar{v}}{3}\right). \quad (2.34)$$

Under these assumptions, a model for the EAD pressure rise was found combining Eq. 2.26, Eq. 2.30 and Eq. 2.33:

$$\Delta p_E = \begin{cases} 0, & |V| < |V_0| \\ C_0\varepsilon\frac{V(V-V_0)}{d^2}\frac{d}{\Delta}f\left(\frac{\Delta}{d}\right)h(\bar{v}), & |V| \geq |V_0| \end{cases} \quad (2.35)$$

If $|V|>>|V_0|$, the pressure rise-to-power ratio, $\Theta$, was related to the electrostatic pressure rise across a stage provided by an array of corona discharge electrodes through $$\Theta \approx \frac{1}{|\mu|}\sqrt{C_0\varepsilon\frac{d}{\Delta}f\left(\frac{\Delta}{d}\right)}\frac{h(\bar{v})^{\frac{3}{2}}}{g(\bar{v})}\frac{1}{\sqrt{\Delta p_E}}. \quad (2.36)$$

Equation 2.36 was analogous to Eq. 2.25 and showed that there was a trade-off between the EAD pressure rise provided by an array of corona discharge thrusters and the pressure rise-to-power ratio. This trade-off motivated the use of multiple stages.

This model of corona discharge-based stages ignored the electrostatic interactions between the EAD electrodes and the duct walls. Charge build-up on surfaces can reduce the current delivered by the electrodes at a given voltage.

Similarly to the ideal 1-D model described earlier in this example, the thruster inlet condition was assumed to be $v_B=v_2$. The static pressure at the inlet of the first stage was $p_z$, and the outlet pressure of one stage was also assumed to be the inlet pressure of the adjacent, downstream stage.

To find an expression for the loss coefficient, it was assumed that pressure losses were due to drag forces acting on the collectors. Assuming quasi 1-D conditions, the loss coefficient, $K_L$, were related to the stage drag through $$K_L = \frac{D_{stage}}{\frac{1}{2}\rho v_2^2 A_2} = \frac{\frac{w}{\Delta}c_d\frac{1}{2}\rho v_2^2 bc}{\frac{1}{2}\rho v_2^2 b\Delta\frac{w}{\Delta}} = \frac{c}{d}\frac{d}{\Delta}c_d, \quad (2.37)$$

where $D_{stage}$ was the total drag force on the collectors in a stage; w was the width of a stage, such that there were w/$\Delta$ emitter/collector pairs in a stage; c was the airfoil chord; and $c_d$ was the drag coefficient. The drag coefficient was expected to increase as $\Delta\rightarrow 0$, due to aerodynamic blockage, and this effect was accounted for by using a "wind tunnel correction":

$$c_d = \frac{c_d|_{\Delta\rightarrow\infty}}{1-\frac{1}{2}\frac{c}{d}\frac{d}{\Delta}c_d|_{\Delta\rightarrow\infty}-\frac{\pi}{2}\frac{A_a}{\Delta^2}}, \quad (2.38)$$

where $c_d|_{\Delta\rightarrow\infty}$ was the uncorrected drag coefficient when there was no blockage, and $A_a$ was the airfoil cross-sectional area. The drag coefficient of an airfoil at zero incidence in an incompressible flow was a function of the Reynolds number, Re, such that $$c_d|_{\Delta\rightarrow\infty} = c_d|_{\Delta\rightarrow\infty}(Re),$$

where $$Re = \frac{v_2 c}{v}$$

and v was the kinematic viscosity of the fluid. The ratio $$\frac{A_a}{\Delta^2}$$

was related to other geometric parameters through $$\frac{A_a}{\Delta^2} = \frac{A_a}{c^2}\left(\frac{c}{d}\right)^2\left(\frac{d}{\Delta}\right)^2, \quad (2.39)$$

where the parameter $$\frac{A_a}{c^2}$$

was a constant for a given airfoil type.

The collectors were assumed to be NACA 0012 airfoils with a ratio of chord-to-gap spacing $$\frac{c}{d} = 1,$$

and a gap spacing of d=20 mm was used for all stages. The drag characteristics of a NACA 0012 airfoil were found using the software Xfoil as a function of the Reynolds number. The stage loss coefficient was computed using Eq. 2.37, which only considered pressure losses due to drag forces acting on the collectors.

The parameters $C_0$ and $V_0$, which define the current characteristics, depended on the electrode geometry. In the absence of experimental data for corona discharges with a wire emitter and a NACA 0012 airfoil collector, parameters were inferred from the experimental data obtained with a cylindrical ion collector with a diameter of 12 mm. Thus, it was assumed that $C_0\approx 0.75$. The inception voltage for a gap spacing of d=20 mm was assumed to be $|V_0|$=6.1 kV. Stages were assumed to be repeating, with d=20 mm and $|V|$=20 kV.

Figure 15B:
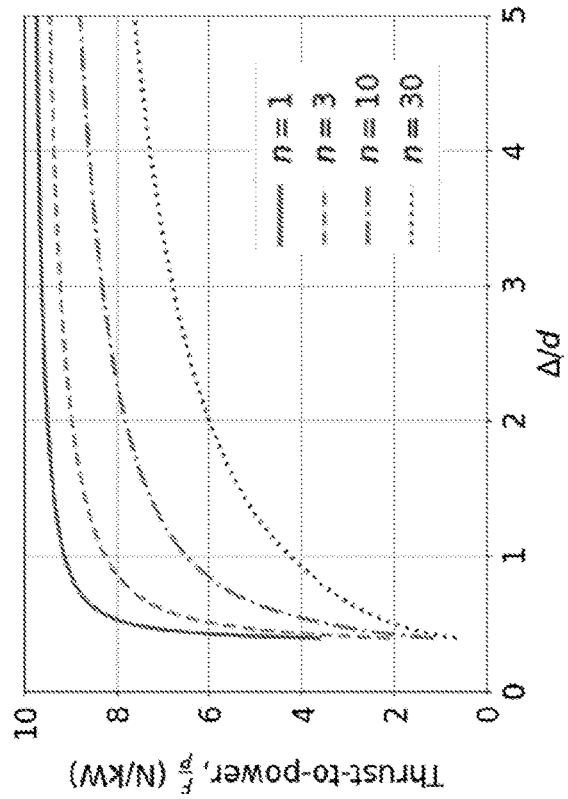
FIG. 15B presents simulated thruster properties of electroaerodynamic devices, according to some embodiments.
Figure 15A:
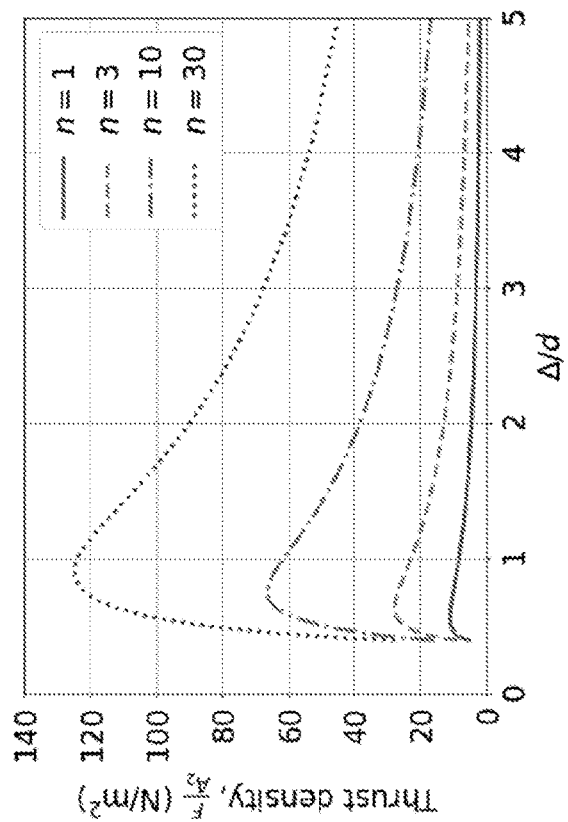
FIG. 15A presents simulated thruster properties of electroaerodynamic devices, according to some embodiments.

FIGS. 15A-15B show the effect of changing the ratio of interelectrode distance-to-gap spacing, $\Delta$ on the performance of an MSD thruster at static conditions. The thrust density results in FIG. 15A show that there was a ratio $$\frac{\Delta}{d}$$

that provides maximum thrust density; however, the $$\frac{\Delta}{d}$$

at which thrust density was maximized depended on the number of stages, due to the coupling between stage EAD pressure rise and pressure losses. FIG. 15B shows that for a given number of stages, maximum thrust-to-power was obtained as $$\frac{\Delta}{d} \to \infty.$$

Increasing $$\frac{\Delta}{d}$$

reduced the velocity through the thruster and, hence, reduced pressure losses. FIG. 15A shows that increasing the number of stages provided a higher thrust density at any given $$\frac{\Delta}{d};$$

in contrast, FIG. 15B showed that adding more stages reduced the thrust-to-power ratio for a given $$\frac{\Delta}{d}.$$

This occurred because adding more stages resulted in higher bulk velocities through the thruster and, therefore, higher stage pressure losses. Since the EAD pressure rise-to-power ratio Θ was only a weak function of the bulk velocity, the result was that as more stages were added, each stage provided a lower net pressure rise but drew approximately the same power, resulting in a lower overall thrust-to-power ratio.

Figures 16A, 16B, 16C:
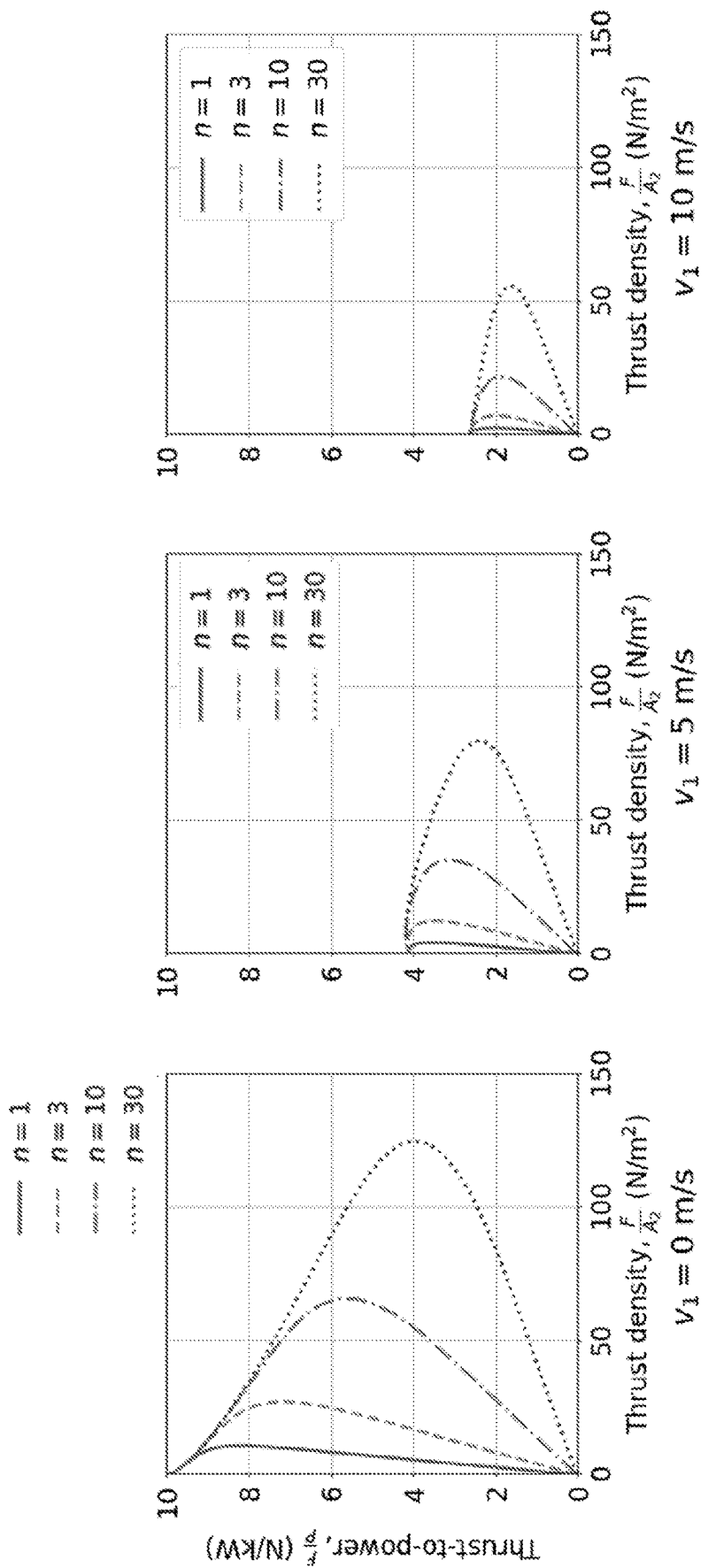
FIG. 16A presents simulated thruster properties of electroaerodynamic devices, according to some embodiments.
FIG. 16B presents simulated thruster properties of electroaerodynamic devices, according to some embodiments.
FIG. 16C presents simulated thruster properties of electroaerodynamic devices, according to some embodiments.

The thrust-to-power ratio was shown against the thrust density in FIGS. 16A-16C, for different freestream velocities. The results in FIG. 16A for $v_1=0$ m/s were the same as those in FIGS. 15A-15B, and were parameterized by $$\frac{\Delta}{d}.$$

The results in FIGS. 16A-16C show that for any freestream velocity, there was a combination of number of stages and $$\frac{\Delta}{d}$$

that provides maximum thrust-to-power for a given thrust density. FIG. 16A shows that an MSD thruster with 30 corona discharge stages can deliver a thrust density of 100 N/m² at a thrust-to-power ratio of 5.6 N/KW at static conditions. The results in FIGS. 16A-16C also shows the advantages of multi-staging over single-stage thrusters: for all the freestream velocities shown, a thruster with n=30 stages provided a similar or higher thrust density at a given thrust-to-power ratio than a thruster with n=1.

Since pressure losses scaled with the velocity through the thruster squared, both the thrust density and thrust-to-power ratio decreased as the freestream velocity increased. FIGS. 16A-16C illustrated this effect: an MSD thruster with 30 stages in static conditions (FIG. 16A) delivered a maximum thrust density of 125 N/m² at a thrust-to-power of 4.0 N/kW; however, the same thruster at $v_1=10$ m/s had a maximum thrust density of 46 N/m² at a thrust-to-power ratio of 1.6 N/kW.

Figures 17A, 17B, 17C:
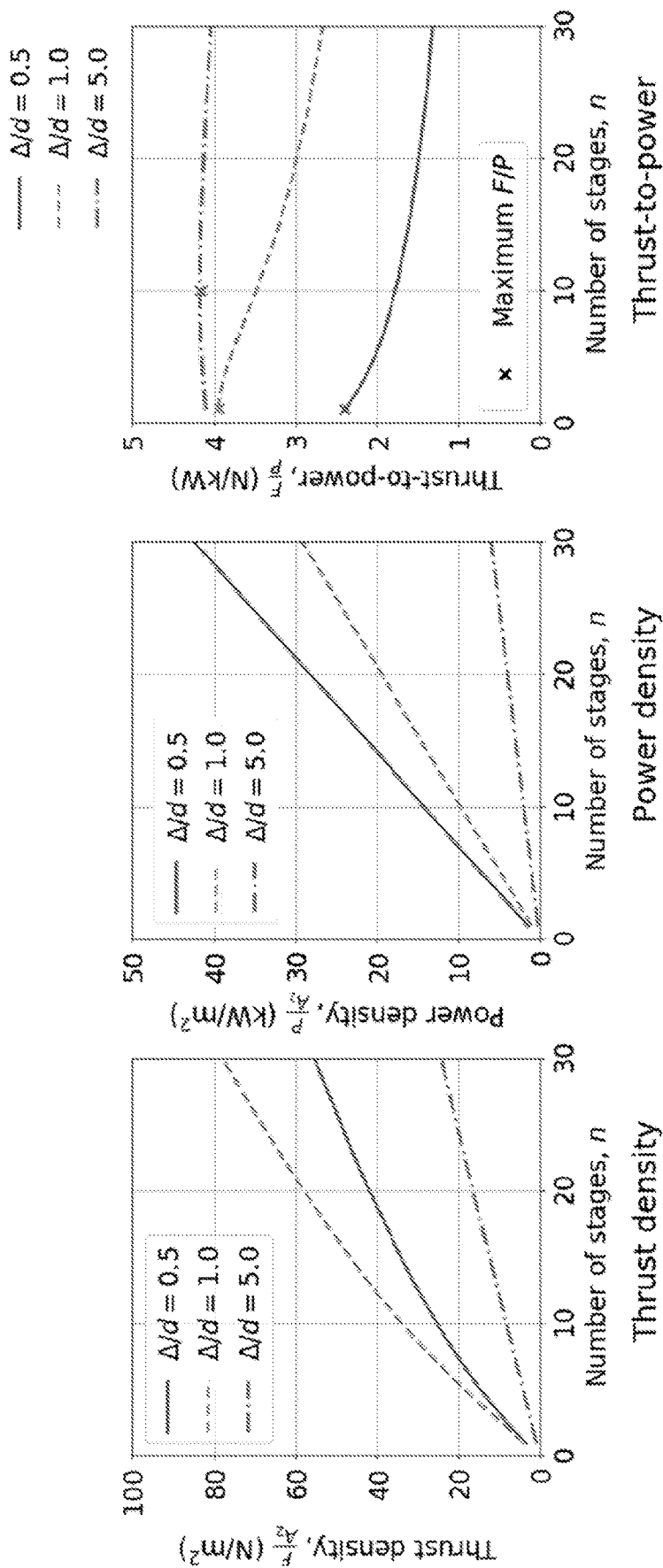
FIG. 17A presents simulated thruster properties of electroaerodynamic devices, according to some embodiments.
FIG. 17B presents simulated thruster properties of electroaerodynamic devices, according to some embodiments.
FIG. 17C presents simulated thruster properties of electroaerodynamic devices, according to some embodiments.

FIGS. 17A-17C show how the thrust density, power draw per unit thruster cross-sectional area, and thrust-to-power ratio changed with the number of stages in an MSD thruster at a freestream velocity of $v_1=5$ m/s. As before, stages were repeating, with d=20 mm and |V|=20 kV. In FIG. 17A, it was observed that the thrust density increased with the number of stages; however, the cases when $$\frac{\Delta}{d} = 0.5 \text{ and } \frac{\Delta}{d} = 1.0$$

showed that this increase occurred with diminishing returns. As shown in FIG. 18B, the thruster power consumption varied approximately linearly with the number of stages. As result of these two effects, the thrust-to-power in the $$\frac{\Delta}{d} = 0.5 \text{ and } \frac{\Delta}{d} = 1.0$$

cases, shown in FIG. 17C, was reduced as more stages were added. In contrast, the thrust-to-power ratio of the $$\frac{\Delta}{d} = 5.0$$

case was higher than the thrust-to-power ratio of the $$\frac{\Delta}{d} = 0.5 \text{ and } \frac{\Delta}{d} = 1.0$$

cases, and remained approximately constant in the range of n in FIG. 17C. This finding was believed to result from the fact that the $$\frac{\Delta}{d} = 5.0$$

case was near the optimal front that provided maximum thrust-to-power for a given thrust density.

The results in FIGS. 15A-17C were obtained at a constant stage DC voltage of |V|=20 kV. FIGS. 18A-18C show the effect of changing the stage DC voltage at static conditions, with a constant $$\frac{\Delta}{d} = 1.$$

Stages were assumed to be repeating, with d=20 mm, and freestream conditions were static ($v_1=0$ m/s).

As shown in FIG. 18A, above the corona inception voltage, the thrust density increased with voltage due to the approximately quadratic dependency of EAD pressure rise with voltage, as expressed by Eq. 2.35. However, the thrust-to-power ratio in FIG. 18B was a decreasing function of the DC voltage, except at voltages very close to the inception voltage. This was expected due to the trade-off between EAD pressure rise and the ratio $\Theta$. FIG. 18C, in which lines were parametrised by DC voltage, showed that at high thrust density levels, the thrust-to-power ratio decreased with increasing thrust density. FIG. 18C also shows that there was an optimal front that provided maximum thrust-to-power for a given thrust density.

These results demonstrate the advantages of multi-stage and ducted thrusters such as those described herein, and demonstrate the viability of electroaerodynamic thrusters wherein the ion collector was an airfoil.

EXAMPLE 3

In this example, some basic thruster performance results were found by combining the momentum theory of Example 1 with either the ideal 1-D thruster model or the corona discharge model of Example 2. The static pressure rise across a thruster with n stages was given by $$\Delta p = \sum_{i=1}^{n} \Delta p_{stage}^{i} = \sum_{i=1}^{n}\left(\Delta p_E^i - \frac{1}{2}\rho v_2^2 K_L^i\right), \quad (2.40)$$

where the superscript i refers to the properties of stage i. The bulk velocity in the thruster was related to the pressure rise $\Delta p$ by Eq. 2.2. In general, $\Delta p_{stage}^i$ was a function of the bulk velocity, as expressed by Eq. 2.18 for an ideal 1-D device, and by Eq. 2.35 for a corona discharge-based device. In order to reach an analytical solution, it was assumed that the stages were repeating, yielding:

$$\sum_{i=1}^{n}\left(\Delta p_E^i - \frac{1}{2}\rho v_2^2 K_L^i\right) = n\left(\Delta p_E - \frac{1}{2}\rho v_2^2 K_L\right), \quad (2.41)$$

It was further assumed that $\Delta p_E$ and $K_L$ were independent of the number of stages and the nozzle area ratio. Substituting Eq. 2.2 and Eq. 2.41 into Eq. 2.40 and rearranging, the pressure rise across the thruster was approximated as $$\Delta p \approx n\frac{\Delta p_E - \frac{1}{2}\rho v_1^2 K_L \phi^2}{1 + nK_L\phi^2}. \quad (2.42)$$

Equation 2.42 shows that, as more stages were added, the pressure across the thruster increase with diminishing returns. As $n \to \infty$, the pressure rise across the thruster in Eq. 2.42 tended to $$\Delta p \to \frac{\Delta p_E}{K_L\phi^2} - \frac{1}{2}\rho v_1^2. \quad (2.43)$$

The thrust density corresponding to the pressure rise in Eq. 2.42 was computed from Eq. 2.4. In non-dimensional form, this was given by $$\frac{F}{A_2 \Delta p_E} = \phi\left(\frac{2n + \frac{\rho v_1^2}{\Delta p_E}}{1 + nK_L\phi^2}\right)\left(1 - \sqrt{\frac{1 + nK_L\phi^2}{1 + \frac{2n\Delta p_E}{\rho v_1^2}}}\right) \quad (2.44)$$

A simplified result was obtained in the case when $v_1 \to 0$, corresponding to static thruster conditions. In this case, the normalized thrust density became $$\frac{F}{A_2\Delta p_E} = \frac{2n\phi}{1 + nK_L\phi^2}. \quad (2.45)$$

The optimum nozzle area ratio $\phi|_{opt}$ that maximized the thrust density in this case was $$\phi|_{opt} = \sqrt{\frac{1}{nK_L}}. \quad (2.46)$$

The derivation of Eqs. 2.42-2.46 assumed that $\Delta p_E$ and $K_L$ did not depend on the number of stages and the nozzle area ratio. In general, Eq. 2.2, Eq. 2.18, or Eq. 2.35, and Eq. 2.40 should be solved simultaneously to determine the pressure rise across the thruster, $\Delta p$, and from this, the thrust density.

These analytic results may be useful for identifying useful geometry for electroaerodynamic thrusters, in some embodiments.

EXAMPLE 4

In this example, a ducted electroaerodynamic thruster with a single stage of corona discharge electrodes was constructed and tested. A duct was made out of foam, and the internal cross-section of the thruster was a 600 mm×400 mm rectangle. The thruster included 20 ion sources and 20 ion collectors, each extending 600 mm (across the width of the duct). A separation between ion sources and associated ion collectors was d=20 mm, and a lateral distance between ion source-ion collector pairs was $\Delta$=20 mm. The ion sources were 44 AWG tungsten wires and the collectors were wooden flat plates 25.4 mm long in the downstream direction, having a maximum transverse height of 0.8 mm, and coated in aluminum foil. The ion collectors were coated in aluminum.

Figure 19A:
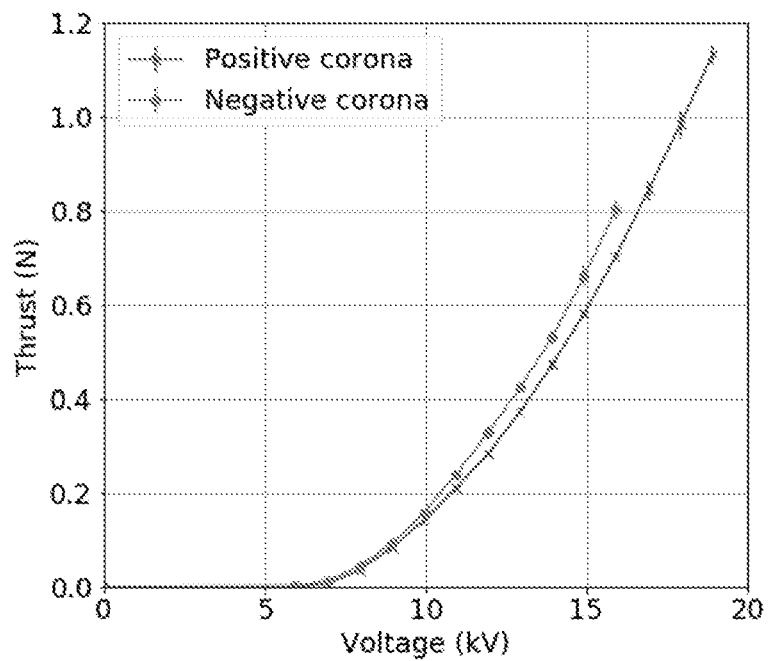
FIG. 19A presents experimentally determined thruster properties of electroaerodynamic a single stage ducted thruster, according to some embodiments.
Figure 19B:
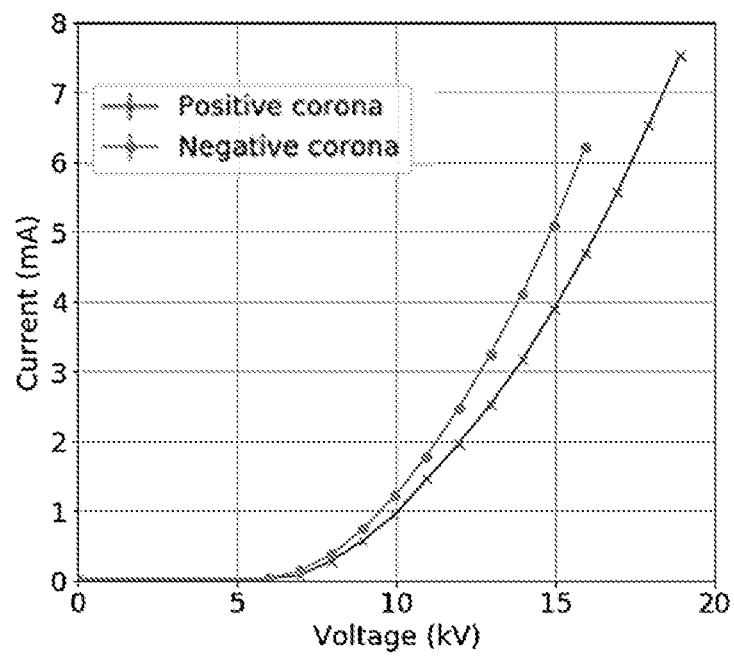
FIG. 19B presents experimentally determined thruster properties of electroaerodynamic a single stage ducted thruster, according to some embodiments.

The thruster was tested up to the maximum voltage that could be achieved before sparking was observed. The results showed that the thruster could produce newton-levels of thrust. FIG. 19A shows thrust vs. voltage in two cases—positive corona discharge and negative corona discharge. In the negative corona discharge configuration, the ion sources were grounded and the ion collectors were at a high positive voltage. In the positive corona discharge configuration, the ion sources were at a high positive voltage and the ion collectors were grounded. FIG. 19B shows the current through the thruster as a function of voltage.

Figure 19C:
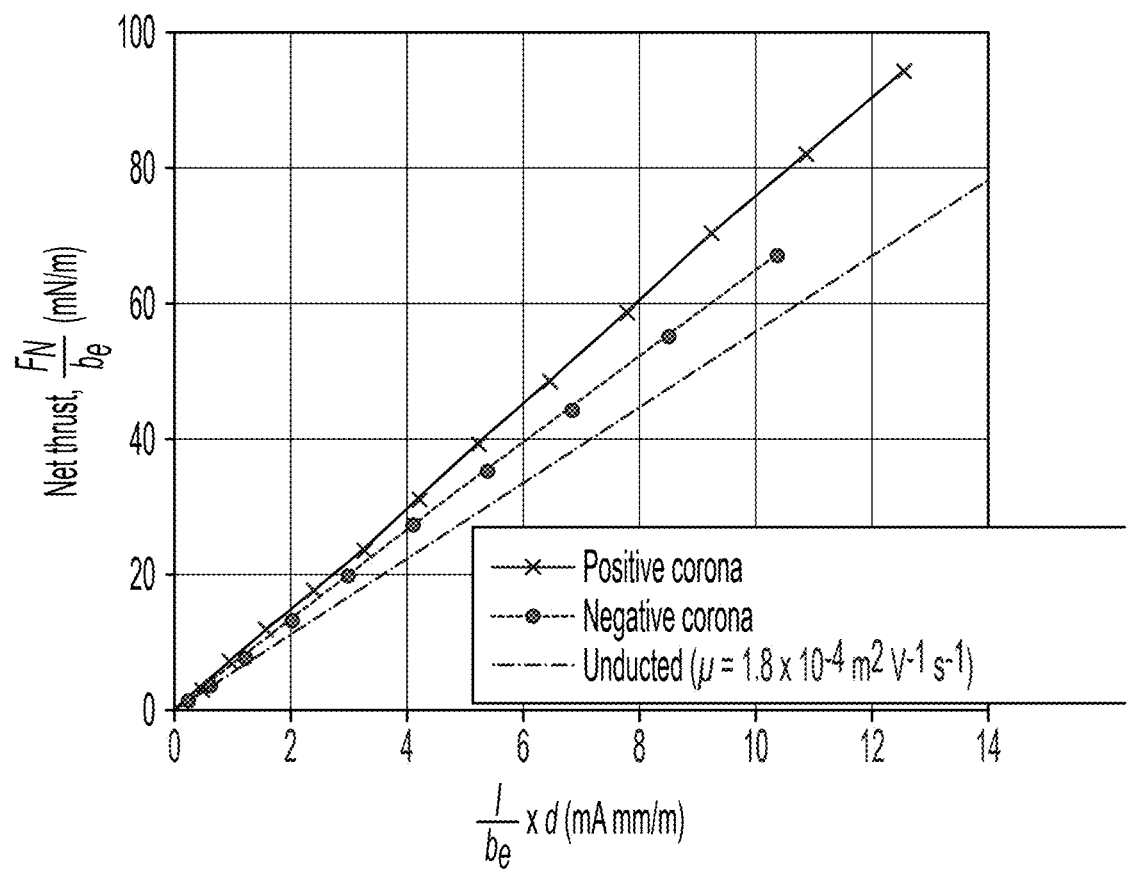
FIG. 19C presents experimentally determined thruster properties of electroaerodynamic a single stage ducted thruster, according to some embodiments.

To show that the duct contributed to the thrust, the experimentally measured thrust ($F_N$) per unit emitter span ($b_e$) was plotted (along the y axis) against the product of current (I) per unit emitter span and gap spacing (d) (along the x-axis). FIG. 19C presents the results. The dashed line represents the predicted proportionality for an unducted thruster, which has a slope proportional to $1/\mu$, where $\mu$ is the ion mobility and has the value $1.8 \times 10^{-4}$ $m^2V^{-1}s^{-1}$. As shown, the experimental thrust exceeded the theoretical proportionality, as a result of the presence of the duct. This example demonstrates the utility of the duct for improving thrust production.

EXAMPLE 5

This example demonstrates the comparative silence of an electroaerodynamic (EAD) thruster. The thruster was an unducted thruster using positive corona discharges. The ion source was a 36 AWG tungsten wire, and the collector was a tapered wing with an Aquila 93 airfoil profile, with a root chord of 340 mm mm and a tip chord of 170 mm mm. Both electrodes had a span of 2.9 m. The 30% frontal part of the wing's chord was covered in aluminum foil. The thruster produced 0.7 N of thrust. The distance between the ion source and the collector was 120 mm and the voltage was 70 kV.

Figure 20:
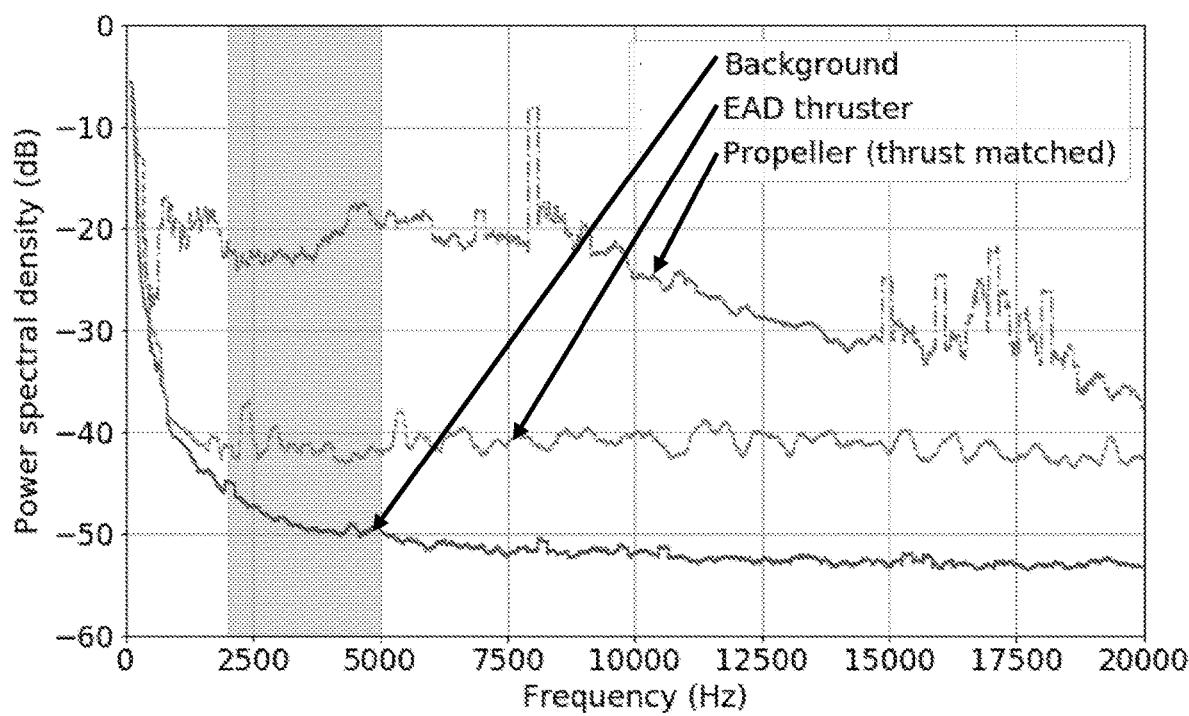
FIG. 20 presents experimentally determined sound magnitudes of various thrusters, according to some embodiments

In this example, the thruster was operated while ambient sound was recorded, and an audiogram of the recorded sound over a range of frequencies audible to humans was produced. FIG. 20 shows the audiogram of the EAD thruster, comparing it with an audiogram of background noise absent any thruster activity. Finally, a propeller, thrust-matched to the EAD thruster, was operated, and the ambient sound was recorded. As shown in FIG. 20, the thrust-matched propeller was at least 5 dB and up to 30 dB louder than the EAD thruster, with the precise difference in magnitude depending on the acoustic frequency. This example demonstrate that the use of EAD thrusters can provide a significant reduction in sound magnitude, relative to a thrust-matched propeller. Thus, the use of EAD thrusters may facilitate significantly quieter operation of aircraft.

EXAMPLE 6

This example demonstrates the use of a multi-staged ducted thruster produced by stacking two modular ducted stages. The composite duct formed by the two stages each had a square internal cross-section of 180 mm/side. Each of the modular cross-sections had a longitudinal length of 50.8 mm. Each stage contained 9 ion sources and 9 ion collectors, each 180 mm in length and extending across the width of the thruster. The ion sources were 44 AWG tungsten wires and the collectors were wooden flat plates 10 mm long in the downstream direction, having a maximum transverse height of 0.8 mm, and coated in aluminum foil. The ion collectors were coated in aluminum. A separation between ion sources and associated ion collectors was d=20 mm, and a lateral distance between ion source-ion collector pairs was Δ=20 mm. The distance between stages was 21 mm. The ion source of the first stage and the ion collector of the second stage were at high positive voltage, whereas the ion source of the second stage and the ion collector of the first stage were grounded. This electrical arrangement resulted in an alternating discharge polarity; the first stage produced positive corona discharge and the second stage produced negative corona discharge.

Figure 21A:
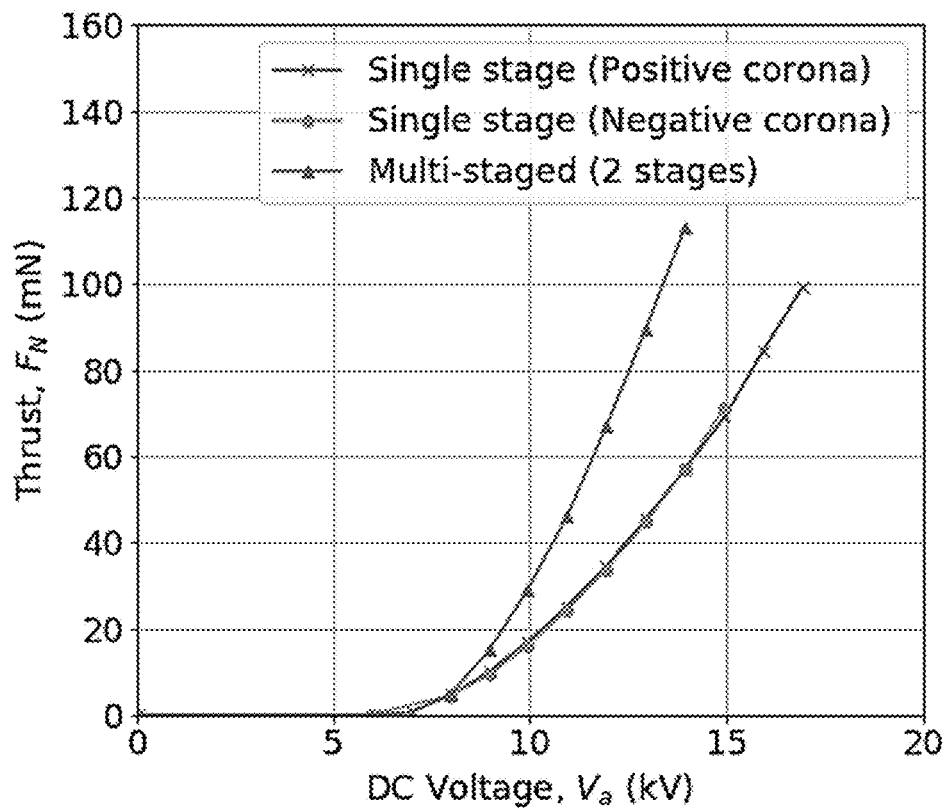
FIG. 21A presents experimentally determined thruster properties of electroaerodynamic a multistage ducted thruster, according to some embodiments.
Figure 21B:
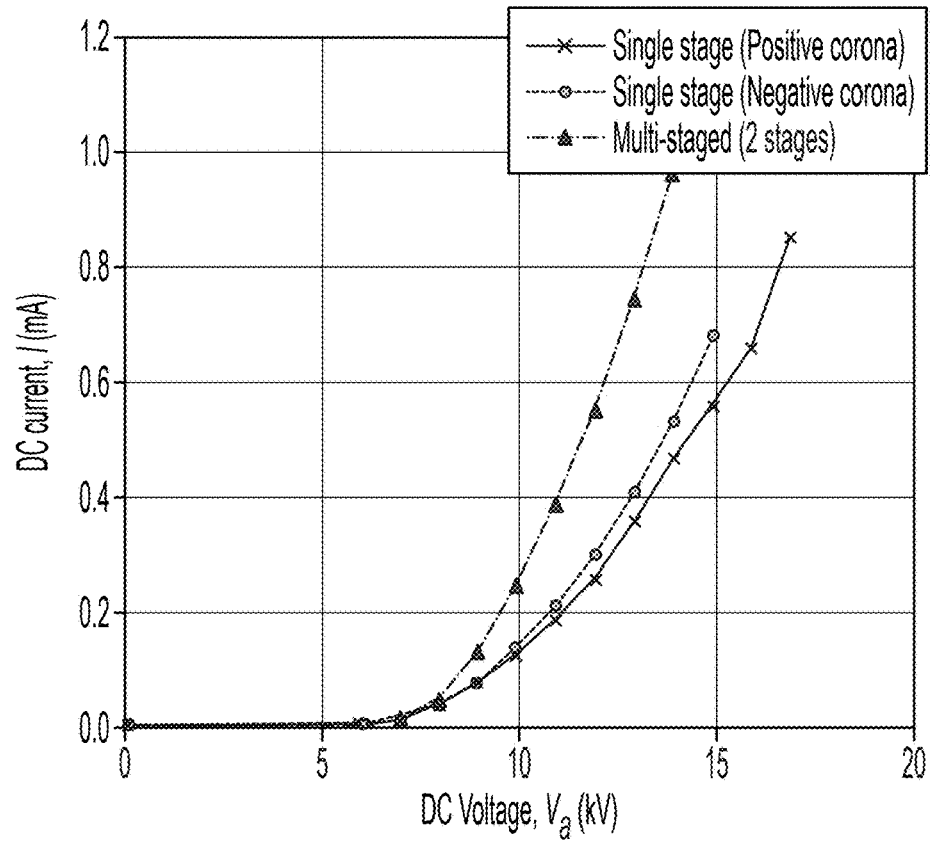
FIG. 21B presents experimentally determined thruster properties of electroaerodynamic a multistage ducted thruster, according to some embodiments.

FIG. 21A presents thrust as a function of voltage for each single stage and for the multi-stage thruster. FIG. 22B presents current passing through the multi-stage thruster and through each individual stage operating independently. These results demonstrate that multi-stage thrusters can beneficially increase the thrust density of an electroaerodynamic thruster.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The invention claimed is:

1. An electroaerodynamic device comprising:
a duct including an inlet and an outlet; and
a plurality of serially arranged electroaerodynamic stages disposed in the duct along at least a portion of a length of the electroaerodynamic device, wherein each stage of the plurality of serially arranged electroaerodynamic stages includes a plurality of ion sources and a plurality of ion collectors distributed across at least a portion of a height of the electroaerodynamic device.

2. The electroaerodynamic device of claim 1, wherein the duct is configured to act as a lifting surface.

3. The electroaerodynamic device of claim 1, wherein the plurality of ion sources extends across a width of the duct.

4. The electroaerodynamic device of claim 1, wherein the plurality of ion collectors extends across a width of the duct.

5. The electroaerodynamic device of claim 1, wherein ion collectors of a first stage of the plurality of serially arranged electroaerodynamic stages have a same polarity as ion sources of a second stage of the plurality of serially arranged electroaerodynamic stages, located downstream from and adjacent to the first stage.

6. The electroaerodynamic device of claim 1, wherein the ion collectors are airfoils.

7. An electroaerodynamic device comprising:
a duct including an inlet and an outlet; and
an electroaerodynamic stage disposed in the duct along at least a portion of a length of the duct, wherein the electroaerodynamic stage includes a plurality of ion sources and a plurality of ion collectors, and wherein the electroaerodynamic stage includes at least one ion source of the plurality of ion sources extending across a width of the duct and at least one ion collector of the plurality of ion collectors extending across the width of the duct.

8. The electroaerodynamic device of claim 7, wherein the electroaerodynamic device comprises a plurality of serially arranged electroaerodynamic stages disposed in the duct.

9. The electroaerodynamic device of claim 7, wherein the duct is configured to act as a lifting surface.

10. The electroaerodynamic device of claim 7, wherein the plurality of ion sources extends across the width of the duct.

11. The electroaerodynamic device of claim 7, wherein the plurality of ion collectors extends across the width of the duct.

12. The electroaerodynamic device of claim 8, wherein ion collectors of a first stage of the plurality of serially arranged electroaerodynamic stages have a same polarity as ion sources of a second stage of the plurality of serially arranged electroaerodynamic stages located downstream from and adjacent to the first stage.

13. The electroaerodynamic device of claim 7, wherein the ion collectors are airfoils.

14. An aircraft comprising:
at least one electroaerodynamic device comprising:
a duct configured to function as a lifting surface; and
a plurality of serially arranged electroaerodynamic stages disposed in the duct along at least a portion of a length of the duct, wherein each electroaerodynamic stage of the plurality of serially arranged electroaerodynamic stages includes at least one ion source and at least one ion collector.

15. The aircraft of claim 14, wherein the aircraft comprises more than one electroaerodynamic device.

16. The aircraft of claim 14, wherein the duct is configured to act as a lifting surface.

17. The aircraft of claim 14, wherein the plurality of ion sources extends across a width of the duct.

18. The aircraft of claim 14, wherein the plurality of ion collectors extends across a width of the duct.

19. The aircraft of claim 14, wherein ion collectors of a first stage have a same polarity as ion sources of a second stage located downstream from and adjacent to the first stage.

20. The aircraft of claim 14, wherein the ion collectors are airfoils.

* * * * *